United States Patent
Watanabe et al.

(10) Patent No.: US 10,059,813 B2
(45) Date of Patent: Aug. 28, 2018

(54) COLORED RESIN PARTICLE DISPERSION, METHOD FOR PRODUCING SAME, AND INKJET INK

(71) Applicant: RISO KAGAKU CORPORATION, Tokyo (JP)

(72) Inventors: Yoshifumi Watanabe, Ibaraki (JP); Manami Shimizu, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 159 days.

(21) Appl. No.: 15/205,300

(22) Filed: Jul. 8, 2016

(65) Prior Publication Data
US 2017/0015793 A1    Jan. 19, 2017

(30) Foreign Application Priority Data

Jul. 14, 2015    (JP) .................. 2015-140686

(51) Int. Cl.
| | |
|---|---|
| *C08J 3/11* | (2006.01) |
| *C08K 3/04* | (2006.01) |
| *C09D 11/38* | (2014.01) |
| *C09D 11/328* | (2014.01) |
| *C09D 11/36* | (2014.01) |
| *C08K 5/52* | (2006.01) |
| *C09D 11/324* | (2014.01) |
| *C09D 11/00* | (2014.01) |
| *C09D 11/30* | (2014.01) |
| *C09D 11/322* | (2014.01) |
| *G03G 9/12* | (2006.01) |
| *G03G 9/13* | (2006.01) |
| *G03G 5/10* | (2006.01) |

(52) U.S. Cl.
CPC . *C08J 3/11* (2013.01); *C08K 3/04* (2013.01); *C08K 5/52* (2013.01); *C09D 11/00* (2013.01); *C09D 11/30* (2013.01); *C09D 11/322* (2013.01); *C09D 11/324* (2013.01); *C09D 11/328* (2013.01); *C09D 11/36* (2013.01); *C09D 11/38* (2013.01); *G03G 5/105* (2013.01); *G03G 5/107* (2013.01); *G03G 9/12* (2013.01); *G03G 9/13* (2013.01); *C08J 2325/06* (2013.01); *C08J 2325/14* (2013.01); *C08J 2363/00* (2013.01); *C08J 2367/00* (2013.01); *C08J 2375/04* (2013.01)

(58) Field of Classification Search
None
See application file for complete search history.

(56) References Cited

U.S. PATENT DOCUMENTS

| | | | |
|---|---|---|---|
| 5,780,196 A | 7/1998 | Fujiwara et al. | |
| 8,124,309 B2 | 2/2012 | Lai et al. | |
| 8,263,303 B2 | 9/2012 | Matsuoka et al. | |
| 2015/0197666 A1* | 7/2015 | Shimizu | C09D 11/36 524/127 |

FOREIGN PATENT DOCUMENTS

| | | |
|---|---|---|
| JP | H09-179354 A | 7/1997 |
| JP | 2005-255911 A | 9/2005 |
| JP | 2007-197632 A | 8/2007 |
| JP | 2010-248511 A | 11/2010 |
| JP | 2014-019770 A | 2/2014 |

OTHER PUBLICATIONS

DISPERBYK-111 Safety Data Sheet (2016). (Year: 2016).*
European Search Report issued with respect to Application No. 16179204.9, dated Nov. 21, 2016.

* cited by examiner

*Primary Examiner* — Catherine S Branch
(74) *Attorney, Agent, or Firm* — Greenblum & Bernstein, P.L.C.

(57) ABSTRACT

A colored resin particle dispersion and an inkjet ink are provided which preferably exhibit excellent rub fastness and alcohol resistance, and yield printed items having high image density. Specifically, a colored resin particle dispersion includes colored resin particles, a basic dispersant and a non-aqueous solvent. The colored resin particles include a colorant, a thermoplastic solid resin and a liquid organic compound having an acidic group, and the thermoplastic solid resin has a polar parameter $\delta p$ and a hydrogen bonding parameter $\delta h$ from the Hansen solubility parameters that satisfy $\delta p=2.5$ to $11.0$ and $\delta h=5.0$ to $12.0$ respectively is provided.

17 Claims, No Drawings

COLORED RESIN PARTICLE DISPERSION, METHOD FOR PRODUCING SAME, AND INKJET INK

CROSS REFERENCE TO RELATED APPLICATIONS

This application is based upon and claims the benefit of priority from prior Japanese Patent Applications No. 2015-140686 filed on Jul. 14, 2015, the entire contents of which are incorporated by reference herein.

BACKGROUND OF THE INVENTION

Field of the Invention

The present invention relates to a colored resin particle dispersion, a method for producing the colored resin particle dispersion, and an inkjet ink.

Description of the Related Art

Colored resin particle dispersions are used as components for printing inks for all manner of printing methods.

The colorants for printing inks can be broadly classified into dyes and pigments. Using a dye offers the advantage of particularly favorable color development. Further, compared with pigments, dyes offer the advantage of superior abrasion resistance, and particularly superior rub fastness. However, dyes themselves exhibit inferior water resistance and marker resistance. On the other hand, pigments offer the advantages of high image density and excellent weather resistance, but exhibit inferior abrasion resistance, and particularly rub fastness, compared with dyes.

In light of these properties, a method has been proposed in which by encapsulating the colorant within a resin to form colored resin particles, an ink can be provided which exhibits excellent abrasion resistance, water resistance and marker resistance, while retaining the image-forming properties of the colorant.

Patent Document 1 and Patent Document 2 each proposes the production of a polymer particle dispersion in which by using an organic solvent A and an organic solvent B having almost no compatibility with the organic solvent A, forming a dispersion composed of a dispersed phase containing the organic solvent B and a resin and a continuous phase containing the organic solvent A, and then removing the organic solvent B from the dispersion under reduced pressure or heating, a polymer particle dispersion is produced containing polymer particles dispersed in the organic solvent A.

However, the above documents did not investigate the abrasion resistance of images obtained by preparing a printing ink using this type of polymer particle dispersion and then printing the ink onto paper or the like. It is difficult to obtain satisfactory image abrasion resistance simply by adding a resin to the ink. Further, another problem arises in that if the colorant is added in an amount sufficient to obtain satisfactory coloration vividness for the printed image, then the viscosity of the polymer particle dispersion increases, making preparation of the dispersion difficult.

Patent Document 3 proposes colored resin particles prepared by dispersing a dispersion phase containing a non-aqueous solvent B, a dye, a resin and an acidic dispersant in a continuous phase containing a non-aqueous solvent A and a basic dispersant to prepare an oil-in-oil emulsion, and then removing the non-aqueous solvent B from this oil-in-oil emulsion.

Patent Document 3 discloses that by using a basic dispersant in the continuous phase and an acidic dispersant in the dispersion phase, the oil-in-oil emulsion can be prepared with excellent emulsion stability regardless of the type of resin used, and a colored resin particle dispersion can be prepared which exhibits excellent water resistance, marker resistance and rub fastness.

Patent Document 4 proposes a method for producing a liquid developer for an electrophotographic method, the method comprising adding a colored resin to a non-polar dispersion medium, heating the non-polar dispersion medium under stirring to at least the softening point of the resin, and then cooling and solidifying the thus obtained resin emulsion.

Patent Document 4 proposes the addition of an oil-soluble surfactant to the non-polar dispersion medium.

Patent Document 5 proposes a method for producing a resin emulsion suitable for producing a toner, the method comprising melting and mixing a resin, adding a surfactant to the resin, adding a basic reagent and water to the resin, and performing ultrasonic mixing. Patent Document 5 also proposes adding a toner composition to the resin, performing a phase inversion to prepare a phase inversion emulsion comprising a dispersed phase containing the melted resin and the toner composition, and then solidifying toner-sized liquid droplets to obtain toner particles.

Patent Document 1: JP 2007-197632 A
Patent Document 2: JP 2005-255911 A
Patent Document 3: JP 2014-019770 A
Patent Document 4: JP H09-179354 A
Patent Document 5: JP 2010-248511 A In Patent Documents 1 to 3, colored resin particle dispersions are obtained via a step of preparing an oil-in-oil emulsion, and a step of removing a low-boiling point solvent from the oil-in-oil emulsion. As a result, because the dispersed phase is prepared by dissolving the resin in a low-boiling point solvent, a problem arises in that the film of the obtained printed item has low resistance relative to the low-boiling point solvent. In particular, in those cases where a lower alcohol solvent is use as the low-boiling point solvent, the alcohol resistance of the printed film becomes a problem. Further, another problem arises in that the production facilities used for the solvent removal and other handling of the low-boiling point solvent require explosion-proof production facilities.

Patent Document 4 proposes a method for producing a liquid developer by using a resin emulsion to prepare a resin particle dispersion. However, in liquid developers for electrophotographic methods, the volume-average particle size of the resin particles is comparatively large. Patent Document 4 discloses an average particle size of 1.5 to 5.0 µm. Further, in liquid developers for electrophotographic methods, the resin particle solid fraction concentration is comparatively low, and no investigations have been conducted into the effects of the types and amounts of the colorant and the resin on the viscosity of the dispersion.

Patent Document 5 proposes a method for producing an aqueous resin emulsion that is suitable for producing a toner. In an aqueous resin emulsion, the resin particles can be dispersed using ionic repulsion. However, if an aqueous resin emulsion is used without further modification as an ink, then because the ink is water-based, paper curling caused by the moisture becomes a problem. Further, if the resin fraction is extracted from the aqueous resin emulsion and dispersed in a non-aqueous solvent, then the extracted resin fraction tends to aggregate, and dispersion in the non-aqueous solvent becomes difficult.

An object of the present invention is to provide a colored resin particle dispersion and an inkjet ink which exhibit

SUMMARY OF THE INVENTION

The present invention includes the following aspects.

(1) A colored resin particle dispersion comprising colored resin particles, a dispersant and a non-aqueous solvent, wherein the colored resin particles comprise a colorant, a thermoplastic solid resin and a liquid organic compound having an acidic group, a basic group, or a combination thereof, the liquid organic compound has at least the acidic group when the dispersant is a basic dispersant, and the liquid organic compound has at least the basic group when the dispersant is an acidic dispersant, and the thermoplastic solid resin has a polar parameter δp and a hydrogen bonding parameter δh from the Hansen solubility parameters that satisfy δp=2.5 to 11.0 and δh=5.0 to 12.0 respectively.

(2) The colored resin particle dispersion according to (1), wherein the liquid organic compound has at least the acidic group, and the acidic group of the liquid organic compound comprises a phosphoric acid group.

(3) The colored resin particle dispersion according to (1), wherein the non-aqueous solvent has a Hansen solubility parameter of 14 to 18 MPa$^{1/2}$, a dispersion parameter δd of 12 to 20, a polar parameter δp of 0 to 4, and a hydrogen bonding parameter δh of 0 to 4.

(4) The colored resin particle dispersion according to (1), wherein the colored resin particles further comprise a plasticizer.

(5) The colored resin particle dispersion according to (1), wherein an average particle size of the colored resin particles is not more than 1 μm.

(6) The colored resin particle dispersion according to (1), wherein the liquid organic compound has at least the acidic group, and the acidic group of the liquid organic compound comprises at least one of a phosphoric acid group, a carboxyl group, a sulfonic acid group, a phosphate ester group, a sulfate ester group, a nitrate ester group, a phosphorous acid group, a phosphonic acid group and a sulfinic acid group (7) The colored resin particle dispersion according to (1), when the liquid organic compound has at least the basic group, and the basic group of the liquid organic compound comprises at least one of an aminogroup, a pyridyl group, a nitrogen-containing functional group having a urethane linkage and a nitrogen-containing functional group having an amide linkage.

(8) The colored resin particle dispersion according to (1), wherein the thermoplastic solid resin comprises at least one of styrene-(meth)acrylic-based resins, (meth)acrylic-based resins, polyester resins, epoxy resins, styrene resins, thermoplastic polyurethane-based resins, polyvinyl alcohols, styrene-maleic acid resins, alkylphenol resins, cellulose-based resins, polyamide resins, ketone resins, rosin resins, vinyl acetate resins, phosphorylated resins, nitrated resins, alkoxy group-containing resins, and derivatives of these resins.

(9) The colored resin particle dispersion according to (4), wherein the melting point of the plasticizer is 23 degrees C. or lower, and the plasticizer comprises at least one of alcohols, esters, ethers, polyesters, polyethers, epoxy resins and (meth)acrylic polymers.

(10) A method for producing a colored resin particle dispersion, the method comprising preparing a resin emulsion by dispersing a dispersion phase containing a colorant, a thermoplastic solid resin, and a liquid organic compound having an acidic group, a basic group, or a combination thereof with the thermoplastic solid resin in a melted state in a continuous phase containing a dispersant and a non-aqueous solvent, and then cooling the resin emulsion, wherein the thermoplastic solid resin has a solubility in the non-aqueous solvent of 3 g/100 g or less, and the liquid organic compound has at least the acidic group when the dispersant is a basic dispersant, and the liquid organic compound has at least the basic group when the dispersant is a acidic dispersant.

(11) The method for producing a colored resin particle dispersion according to (10), wherein the thermoplastic solid resin has a polar parameter δp and a hydrogen bonding parameter δh from the Hansen solubility parameters that satisfy δp=2.5 to 11.0 and δh=5.0 to 12.0 respectively.

(12) The method for producing a colored resin particle dispersion according to (10), wherein an average particle size of the colored resin particles is not more than 1 μm.

(13) The method for producing a colored resin particle dispersion according to (10), wherein the liquid organic compound has at least the acidic group, and the acidic group of the liquid organic compound comprises at least one of a phosphoric acid group, a carboxyl group, a sulfonic acid group, a phosphate ester group, a sulfate ester group, a nitrate ester group, a phosphorous acid group, a phosphonic acid group and a sulfinic acid group

(14) The method for producing a colored resin particle dispersion according to (10), wherein the liquid organic compound has at least the basic group, an the basic group of the liquid organic compound comprises at least one of an aminogroup, a pyridyl group, a nitrogen-containing functional group having a urethane linkage and a nitrogen-containing functional group having an amide linkage.

(15) The method for producing a colored resin particle dispersion according to (10), wherein the thermoplastic solid resin comprises at least one of styrene-(meth)acrylic-based resins, (meth)acrylic-based resins, polyester resins, epoxy resins, styrene resins, thermoplastic polyurethane-based resins, polyvinyl alcohols, styrene-maleic acid resins, alkylphenol resins, cellulose-based resins, polyamide resins, ketone resins, rosin resins, vinyl acetate resins, phosphorylated resins, nitrated resins, alkoxy group-containing resins, and derivatives of these resins.

(16) The method for producing a colored resin particle dispersion according to (10), wherein the dispersion phase further contains a plasticizer which melting point is 23 degrees C. or lower, and the plasticizer comprises at least one of alcohols, esters, ethers, polyesters, polyethers, epoxy resins and (meth)acrylic polymers.

(17) An inkjet ink comprising the colored resin particle dispersion according to (1).

DETAILED DESCRIPTION OF THE EMBODIMENTS

First Embodiment

A colored resin particle dispersion according to one embodiment of the present invention (hereafter sometimes referred to as simply "the dispersion") comprises colored resin particles, a basic dispersant and a non-aqueous solvent, wherein the colored resin particles comprise a colorant, a thermoplastic solid resin and a liquid organic compound having an acidic group, and the thermoplastic solid resin has a polar parameter δp and a hydrogen bonding parameter δh from the Hansen solubility parameters that satisfy δp=2.5 to 11.0 and δh=5.0 to 12.0 respectively.

Hereafter, the liquid organic compound having an acidic group is sometimes referred to as simply "the acidic compound". Further, the thermoplastic solid resin having the solubility characteristics described above is sometimes referred to as simply "the thermoplastic solid resin A".

According to this embodiment, a printed item can be provided which not only exhibits excellent rub fastness, but by using a thermoplastic solid resin having excellent alcohol resistance for the colored resin particles, also exhibits excellent alcohol resistance.

In the present embodiment, by including both the colorant and the acidic compound in the colored resin particles, the rub fastness can be enhanced. Further, the acidic compound enables more uniform blending of the components of the colored resin particles, and therefore the particle size of the colored resin particles can be reduced, the viscosity of the resulting ink can be lowered, and the image density of the printed items can be increased.

Further, by using a thermoplastic solid resin having water resistance in the colored resin particles, the water resistance of the printed items can also be enhanced.

Moreover, in the present embodiment, because the thermoplastic solid resin that constitutes the colored resin particles has the solubility characteristics described above, printed items having excellent alcohol resistance can be provided.

In conventional methods of obtaining colored resin particles from an oil-in-oil emulsion, because the resin is dissolved in a low-boiling point solvent, obtaining the colored resin particles using an alcohol-resistant resin has proven difficult.

Further, in methods of obtaining colored resin particles by heating and melting a thermoplastic solid resin, blending the components of the colored resin particles uniformly is difficult, and therefore various problems arise, including an increase in the particle size of the colored resin particles, an increase in the viscosity of the resulting ink, and a reduction in the image density of the printed items.

In the present embodiment, by using the acidic compound together with a thermoplastic solid resin having the prescribed solubility characteristics in the colored resin particles, the above problems can be resolved.

In particular, in the case of an inkjet ink, a colored resin particle dispersion can be obtained that has a small particle size and low viscosity suitable for inkjet discharge.

(Colored Resin Particles)

The colored resin particles in the present embodiment comprise a colorant, the thermoplastic solid resin A, and a liquid organic compound having an acidic group (the acidic compound).

These colored resin particles preferably have a spherical particle shape in which the colorant, the thermoplastic solid resin A and the acidic compound are mixed together uniformly. Particularly, the colored resin particles preferably are the particles where the colorant, the thermoplastic solid resin A and the acidic compound are dispersed in the solid resin with mixture state.

Thermoplastic Solid Resin A

The thermoplastic solid resin A is preferably a resin that is solid at room temperature (23° C.).

In order to ensure stability of the particle shape, the glass transition temperature (Tg) of the thermoplastic solid resin A is preferably at least 30° C., and more preferably 40° C. or higher. The glass transition temperature of the thermoplastic solid resin A is not particularly limited, but is preferably not higher than 150° C., and is more preferably 120° C. or lower.

Further, in order to ensure stability of the particle shape, the melting temperature (Tm) of the thermoplastic solid resin A is preferably at least 30° C., and more preferably 40° C. or higher. The melting temperature of the thermoplastic solid resin A is not particularly limited, but is preferably not higher than 250° C., and more preferably 200° C. or lower.

The weight-average molecular weight (Mw) of the thermoplastic solid resin A is preferably within a range from 500 to 100,000, and more preferably from 1,000 to 80,000. Within this range, the stability of the shape of the colored resin particles can be enhanced. Further, in the production process for the colored resin particles, the raw materials including the thermoplastic solid resin A can be mixed more uniformly with the solvent, and as a result, colored resin particles having a more uniform composition can be provided.

The weight-average molecular weight of the resin can be determined by the GPC method, and is calculated relative to standard polystyrenes. This also applies below.

The thermoplastic solid resin A has a polar parameter δp and a hydrogen bonding parameter δh from the Hansen solubility parameters that satisfy δp=2.5 to 11.0 and δh=5.0 to 12.0 respectively.

The polar parameter δp for the thermoplastic solid resin A is preferably not more than 11.0, more preferably not more than 10.5, and even more preferably 10.0 or less. This means a resin having superior alcohol resistance can be used for the thermoplastic solid resin A, and enables the alcohol resistance of the printed items to be enhanced. Further, by ensuring that the polar parameter δp is not more than 11.0, the water resistance can be enhanced, and the water resistance of the printed items can also be enhanced.

The polar parameter δp for the thermoplastic solid resin A is preferably at least 2.5, more preferably at least 3.0, and even more preferably 3.5 or greater. This reduces the solubility of the colored resin particles in the non-aqueous solvent used as the solvent medium of the dispersion, and can therefore prevent dissolution of the colored resin particles in the non-aqueous solvent. If the resin fraction dissolves, then the ink viscosity may increase, and the particles may also swell, causing an increase in the particle size. Moreover, dissolution of the resin fraction may also cause a deterioration in the performance of the coating film, such as a reduction in the image density, a deterioration in the show-through properties, and/or a deterioration in the fixability.

The hydrogen bonding parameter δh for the thermoplastic solid resin A is preferably not more than 12.0, more preferably not more than 11.0, and even more preferably 10.5 or less. This enables a resin having superior alcohol resistance to be used for the thermoplastic solid resin A, and can enhance the alcohol resistance of the printed items. Further, by ensuring that the hydrogen bonding parameter δh of the thermoplastic solid resin A is not more than 12.0, the water resistance can be enhanced, meaning the water resistance of the printed items can also be enhanced.

The hydrogen bonding parameter δh for the thermoplastic solid resin A is preferably at least 5.0, more preferably at least 5.5, and even more preferably 6.0 or greater. This reduces the solubility of the colored resin particles in the non-aqueous solvent used as the solvent medium of the dispersion, and can therefore prevent dissolution of the colored resin particles in the non-aqueous solvent. If the resin fraction dissolves, then the ink viscosity may increase, and the particles may also swell, causing an increase in the particle size. Moreover, dissolution of the resin fraction may also cause a deterioration in the performance of the coating film, such as a reduction in the image density, a deterioration in the show-through properties, and/or a deterioration in the fixability.

The overall Hansen solubility parameter (HSP value) of the thermoplastic solid resin A is preferably not more than 23.5 MPa$^{1/2}$, more preferably not more than 23.0 MPa$^{1/2}$, and even more preferably 22.5 MPa$^{1/2}$ or less.

Further, the Hansen solubility parameter (HSP value) of the thermoplastic solid resin A is preferably at least 18.5 MPa$^{1/2}$, more preferably at least 19.0 MPa$^{1/2}$, and even more preferably 19.5 MPa$^{1/2}$ or greater.

By ensuring that the HSP value satisfies the above range, the acidic compound and the colorant can be blended uniformly with the thermoplastic solid resin A to form the colored resin particles. This results in superior rub fastness and image density for the printed items, and means a low-viscosity colored resin particle dispersion having a small particle size can be obtained.

The dispersion parameter δd for the thermoplastic solid resin A is preferably at least 15.0, more preferably at least 16.0, and even more preferably 17.0 or greater.

Further, the dispersion parameter δd for the thermoplastic solid resin A is preferably not more than 20.0, more preferably not more than 19.5, and even more preferably 18.5 or less.

Ensuring that δd satisfies this range enables a low-viscosity colored resin particle dispersion having a small particle size to be obtained.

The method used for calculating the Hansen solubility parameter (HSP value) is described below. In the present invention, the three-dimensional Hansen solubility parameter proposed by Hansen in 1967 is used.

The Hansen solubility parameter divides the solubility parameter introduced by Hildebrand into 3 components, namely the dispersion parameter δd, the polar parameter δp, and the hydrogen bonding parameter δh, and is represented within a three-dimensional space. The dispersion parameter indicates the effects due to dispersive forces, the polar parameter indicates the effects due to dipolar intermolecular forces, and the hydrogen bonding parameter indicates the effects due to hydrogen bonding forces. A more detailed description is provided in "Polymer Handbook. Fourth Edition (Editors: J. Brandrup, E. H. Immergut, and E. A. Grulke)" or the like.

As described below, the Hansen solubility parameter can be determined experimentally.

First, the solubility (10 mass %) of a target substance (such as the thermoplastic solid resin A) in the solvents shown in Table 1, for which the dispersion parameter δd, the polar parameter δp and the hydrogen bonding parameter δh are already known, is investigated. Subsequently, the ranges (minimum values and maximum values) for the dispersion parameter δd, the polar parameter δp and the hydrogen bonding parameter δh that correspond with those solvents which dissolve the target substance are determined, and the values in the middle of those ranges (the central values of the three-dimensional solubility parameter ranges) are used as the three-dimensional solubility parameters for the target substance. In other words, the largest rectangular prism for which good solvents fall inside the prism and poor solvents fall outside the prism is determined, and the center of that rectangular prism is defined as the solubility parameter (HSP value) for the target substance.

Dispersion parameter δd=(δd$_{max}$−δd$_{min}$)/2

Polar parameter δp=(δp$_{max}$−δp$_{min}$)/2

Hydrogen bonding parameter δh=(δh$_{max}$−δh$_{min}$)/2

HSP$^2$=δd$^2$+δp$^2$+δh$^2$

The solvents selected for the solubility tests preferably have Hansen solubility parameters (HSP values) positioned in very different three-dimensional spaces. Table 1 shows the Hansen solubility parameter (HSP value), the dispersion parameter δd, the polar parameter δp and the hydrogen bonding parameter δh for various solvents.

TABLE 1

List of solvents used in solubility tests

| Solvent | HSP (MPa$^{1/2}$) | δd | δp | δh |
|---|---|---|---|---|
| n-heptane | 15.3 | 15.3 | 0.0 | 0.0 |
| tetrachloroethylene | 18.7 | 18.0 | 5.0 | 0.0 |
| cyclohexane | 16.8 | 16.8 | 0.0 | 0.2 |
| toluene | 18.2 | 18.0 | 1.4 | 2.0 |
| tetrahydronaphthalene | 19.8 | 19.6 | 0.0 | 2.9 |
| a-bromonaphthalene | 20.9 | 20.3 | 3.1 | 4.1 |
| diisobutyl ketone | 16.9 | 16.0 | 3.7 | 4.1 |
| propylene carbonate | 27.3 | 20.1 | 18.0 | 4.1 |
| methyl isobutyl ketone | 17.0 | 15.3 | 6.1 | 4.1 |
| methyl ethyl ketone | 19.1 | 16.0 | 9.0 | 5.1 |
| chloroform | 18.9 | 17.8 | 3.1 | 5.7 |
| acetonitrile | 24.4 | 15.3 | 18.0 | 6.1 |
| dichloromethane | 20.2 | 18.2 | 6.3 | 6.1 |
| butyl acetate | 17.4 | 15.8 | 3.7 | 6.3 |
| acetone | 19.9 | 15.5 | 10.4 | 7.0 |
| ethyl acetate | 18.2 | 15.8 | 5.3 | 7.2 |
| N-methylpyrrolidone | 23.0 | 18.0 | 12.3 | 7.2 |
| 1,4-dioxane | 20.5 | 19.0 | 1.8 | 7.4 |
| γ-butyrolactone | 26.3 | 19.0 | 16.6 | 7.4 |
| tetrahydrofuran | 19.5 | 16.8 | 5.7 | 8.0 |
| propylene glycol monomethyl ether acetate | 19.3 | 15.6 | 5.6 | 9.8 |
| dimethyl sulfoxide | 26.7 | 18.4 | 16.4 | 10.2 |
| butyl carbitol | 20.4 | 16.0 | 7.0 | 10.6 |
| diacetone alcohol | 20.8 | 15.8 | 8.2 | 10.8 |
| dimethylformamide | 24.9 | 17.4 | 13.7 | 11.3 |
| propylene glycol monomethyl ether | 20.4 | 15.6 | 6.3 | 11.6 |
| 2-ethylhexanol | 20.2 | 16.0 | 3.3 | 11.9 |
| 2-ethylbutanol | 21.2 | 15.8 | 4.3 | 13.5 |
| cyclohexanol | 22.4 | 17.4 | 4.1 | 13.5 |
| n-pentanol | 21.7 | 16.0 | 4.5 | 13.9 |
| 2-phenoxyethanol | 23.5 | 17.8 | 5.7 | 14.3 |
| 1-butanol | 23.2 | 16.0 | 5.7 | 15.8 |
| methyl cellosolve | 24.8 | 16.2 | 9.2 | 16.4 |
| isopropyl alcohol | 23.6 | 15.8 | 6.1 | 16.4 |
| n-propanol | 24.6 | 16.0 | 6.8 | 17.4 |
| dipropylene glycol | 26.4 | 16.5 | 10.6 | 17.7 |
| ethanol 99.9% | 26.5 | 15.8 | 8.8 | 19.4 |
| diethylene glycol | 29.1 | 16.6 | 12.0 | 20.7 |
| methanol | 29.6 | 15.1 | 12.3 | 22.3 |
| water | 47.9 | 15.5 | 16.0 | 42.4 |

Any solid resin having the properties described above can be used favorably as the thermoplastic solid resin A, and there are no particular limitations on the type of resin used.

Specific examples of the thermoplastic solid resin A include styrene-(meth)acrylic-based resins, (meth)acrylic-based resins, polyester resins, epoxy resins, styrene resins, thermoplastic polyurethane-based resins, polyvinyl alcohols (PVA), styrene-maleic acid resins, alkylphenol resins, cellulose-based resins, polyamide resins, ketone resins, rosin resins, vinyl acetate resins, phosphorylated resins, nitrated resins, alkoxy group-containing resins, and derivatives of these resins.

These resins may be used individually, or a combination of two or more resins may be used.

Examples of resins that can be used as the (meth)acrylic-based resin include not only (meth)acrylic resins having methacrylic units and/or acrylic units, but also copolymers having other units in addition to the methacrylic units and/or acrylic units. Examples of these other units include styrene-based units, vinyl carboxylate units, α-olefin units, diene-based units, ethylenic unsaturated acid units, ethylenic unsaturated acid anhydride units, unsaturated carboxylic acid monoalkyl ester units, sulfonic acid units, nitrogen-containing units such as nitrile, pyridine and pyrrolidone, and ether-based units.

The (meth)acrylic-based resins can be obtained by polymerization of a conventional (meth)acrylic monomer. Examples of the (meth)acrylic monomer include: (meth)acrylic acid, alkyl (meth)acrylate esters in which the alkyl group is a hydrocarbon group having a carbon number of 1 to 22, such as methyl (meth)acrylate and n-butyl (meth)acrylate, aromatic ring-containing (meth)acrylates such as phenyl (meth)acrylate and benzyl (meth)acrylate, hydroxyalkyl (meth)acrylate esters of hydrocarbon groups having a carbon number of 2 to 8, such as 2-hydroxyethyl (meth)acrylate, mono (meth)acrylates of polyalkylene glycols (in which the number of alkylene glycol units is 2 or greater), such as polyethylene glycol mono(meth)acrylate, (meth)acrylate esters containing a polyalkylene oxide skeleton, including mono(meth)acrylate esters of alkoxypolyalkylene glycols such as methoxypolyethylene glycol mono(meth)acrylate and methoxypolypropylene glycol mono(meth)acrylate, nitrogen-containing monomers such as (meth)acrylamide and dimethylaminoethyl (meth)acrylate, epoxy group-containing (meth)acrylates such as glycidyl (meth)acrylate, and unsaturated sulfonic acids such as sulfoethyl acrylate. Combinations of two or more of these monomers may also be used.

Further, monomers other than the (meth)acrylic monomer (hereafter referred to as "other monomers") can be used in combination with the (meth)acrylic monomer. There are no particular limitations on the other monomer, provided it is copolymerizable with the (meth)acrylic monomer, and examples include styrene-based monomers such as styrene and α-methylstyrene, vinyl carboxylate esters such as vinyl acetate, α-olefin monomers such as ethylene, diene-based monomers such as butadiene, ethylenic unsaturated acids and anhydrides thereof such as maleic acid and maleic anhydride, unsaturated carboxylic acid monoalkyl esters such as maleic acid monoesters, nitrogen-containing unsaturated monomers such as (meth)acrylonitrile and vinylpyrrolidone, unsaturated sulfonic acids such as (meth)allyl sulfonic acid, and vinyl ether-based monomers such as vinyl ethyl ether. Combinations of two or more of these monomers may also be used.

The (meth)acrylic-based resin preferably has a weight-average molecular weight (Mw) of 3,000 to 25,000.

Furthermore, a (meth)acrylic-based resin having styrene units can be used favorably as the styrene-(meth)acrylic-based resin. In this case, the ratio (molar ratio) between the styrene units and the (meth)acrylic units is preferably from 0:10 to 7:3.

Examples of commercially available (meth)acrylic-based resins that can be used include UC-3000 from the ARUFON series manufactured by Toagosei Co., Ltd., whereas examples of commercially available styrene-(meth)acrylic-based resins that can be used include UH-2170, US-3900 and UC-5041 from the ARUFON series manufactured by Toagosei Co., Ltd.

The polyester resin preferably has a weight-average molecular weight of 1,000 to 100,000, and more preferably 2,000 to 50,000. Within this range, satisfactory shape stability can be achieved for the colored resin particles at 23° C.

The polyester resin is preferably a thermoplastic resin obtained by the polycondensation of a dihydric or trihydric or higher alcohol component and an acid component such as a carboxylic acid. Examples of preferred alcohol components include alkylene oxide adducts of bisphenol A and lower alkyl diols. Examples of preferred acid components include terephthalic acid and lower alkyl or alkenyl dicarboxylic acids.

Examples of commercially available polyester resins include Polyester HP-325 manufactured by The Nippon Synthetic Chemical Industry Co., Ltd., and M-301 and M-302 manufactured by Sanyo Chemical Industries, Ltd.

The epoxy resin preferably has a weight-average molecular weight of 500 to 50,000, and more preferably 800 to 20,000. Within this range, satisfactory shape stability can be achieved for the colored resin particles at 23° C.

Resins represented by the general formula shown below can be used as the epoxy resin.

[Chemical Formula 1]

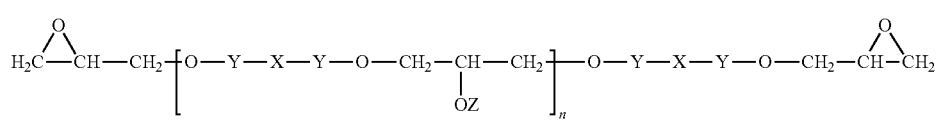

In the formula, X represents —CH$_2$— or —C(CH$_3$)$_2$—,

Y represents

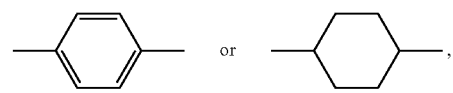

Z represents a hydrogen atom or a glycidyl group, and n represents an integer of 1 to 12.

Examples of commercially available epoxy resins include JER #1001 and #1004 manufactured by Mitsubishi Chemical Corporation, YD-01 and YDF-2001 manufactured by Nippon Steel & Sumitomo Metal Corporation, and EPICLON 1055 manufactured by DIC Corporation.

The styrene resin preferably has a weight-average molecular weight of 1,000 to 50,000, and more preferably 2,000 to 20,000. Within this range, satisfactory shape stability can be achieved for the colored resin particles at 23° C.

Examples of commercially available styrene resins include HIMER ST-95 manufactured by Sanyo Chemical Industries, Ltd., and YS Resin SX100 manufactured by Yasuhara Chemical Co., Ltd.

The thermoplastic polyurethane-based resin preferably has a weight-average molecular weight of 1,000 to 100,000, and more preferably 5,000 to 50,000. Within this range, satisfactory shape stability can be achieved for the colored resin particles at 23° C.

Examples of commercially available thermoplastic polyurethane-based resins include the ESTANE 5700 series of products, such as 5702, 5703 and 5715, and the Pearlstick series of products manufactured by The Lubrizol Corporation.

The alkylphenol resin may be either a novolac-type alkylphenol resin, a resol-type alkylphenol resin, or a combination of the two. A modified alkylphenol resin may also be used.

Polyvinyl alcohols are generally produced using a polyvinyl acetate as a raw material, by substituting the acetate groups of the polyvinyl acetate with hydroxyl groups, and are therefore resins which contain acetate groups as well as hydroxyl groups depending on the degree of substitution.

If the molar ratio of units having a hydroxyl group relative to the combined total of all the units that constitute the polyvinyl alcohol is termed n, and the molar ratio of units having an acetate group (—O—CO—CH$_3$) is termed m, then the degree of saponification is represented by (n/(n+m))×100, and the polymerization degree is represented by n+m.

The degree of saponification (n/(n+m))×100 for the polyvinyl alcohol is preferably from 0 to 60, and more preferably from 1 to 50.

The polymerization degree (n+m) of the polyvinyl alcohol is preferably from 10 to 1,000, and more preferably from 20 to 500.

Examples of the cellulose-based resins include cellulose acetate resins, cellulose acetate butyrate resins and cellulose acetate propionate resins.

Examples of the nitrated resins include nitrocellulose, which is a nitrated ester of cellulose.

The styrene-maleic acid resins are copolymers of styrene and maleic anhydride. Further, esterified products obtained by esterifying a styrene-maleic acid resin to introduce carboxyl groups or hydroxyl groups can also be used as the styrene-maleic acid resin.

Examples of products that can be used as the polyamide resin include nylon-6, nylon-66, nylon 4-6, and copolymer nylons.

Further, by using an aromatic ring-containing resin as the thermoplastic solid resin A, π-π interactions can be expected between the pigment that acts as the colorant and the aromatic ring-containing resin, thus enhancing the dispersibility of the pigment. Among the resins described above, examples of resins that can be used favorably as the aromatic ring-containing resin include styrene-based resins such as styrene-(meth)acrylic-based resins and styrene-maleic acid resins, as well as styrene resins.

The blend amount of the thermoplastic solid resin A described above, relative to the total mass of the colored resin particles, is preferably at least 10 mass %, and more preferably 20 mass % or greater.

On the other hand, the blend amount of the thermoplastic solid resin A relative to the total mass of the colored resin particles is preferably not more than 70 mass %, more preferably not more than 60 mass %, and even more preferably 50 mass % or less.

Acidic Compound

The colored resin particles also comprise a liquid organic compound having an acidic group (the acidic compound). Here, a liquid organic compound having an acidic group describes an organic compound which is liquid at 23° C. and contains an acidic group.

By adding the acidic compound, the rub fastness and the color development properties of the printed items can be further improved. This is because the acidic compound enables the colorant and the thermoplastic solid resin A to be blended more uniformly and stably.

Further, by adding the acidic compound, the particle size of the colored resin particles can be reduced, and the viscosity of the dispersion can be lowered.

Furthermore, when a resin having superior alcohol resistance is used as the thermoplastic solid resin A, the abrasion resistance can sometimes deteriorate, but by adding the acidic compound together with this thermoplastic solid resin A, the alcohol resistance and the abrasion resistance can be improved.

In order to ensure that the acidic compound maintains a liquid state at room temperature, the melting point of the acidic compound is preferably 23° C. or lower, and more preferably 15° C. or lower.

When the acidic compound is dissolved in a non-aqueous solvent, it is preferable that as the concentration of the acidic compound increases, the oxidation-reduction potential (ORP) value increases.

For example, when the acidic compound is dissolved in a solvent capable of dissolving the acidic compound, it is preferable that the ORP value when the acidic compound is dissolved in an amount of 5.0 mass % is higher than the ORP value when the acidic compound is dissolved in an amount of 0.5 mass %.

Further, the ORP value when the acidic compound is dissolved in methanol in an amount of 5.0 mass % is preferably at least 200 mV, and more preferably 300 mV or higher.

On the other hand, if the acidic compound includes a basic group as well as the acidic group, then the compound can still be used favorably as the acidic compound, despite containing a basic group, provided the ORP value exhibits this tendency to increase.

Here, the oxidation-reduction potential (ORP value) describes the value measured at a measurement temperature of 23° C. using a platinum electrode as the working electrode and a silver/silver chloride electrode as the reference electrode, with the measurement conducted by inserting the working electrode and the reference electrode in a solution of any of various materials. For example, the oxidation-reduction potential can be measured using a portable pH meter "pH-208" and an ORP electrode "ORP-14" (both manufactured by FUSO Co., Ltd.). This also applies below.

The Hansen solubility parameter (HSP value) of the acidic compound is preferably from 22 to 27 MPa$^{1/2}$. Further, the acidic compound preferably has a dispersion parameter δd of 13 to 20, a polar parameter δp of 5 to 12, and a hydrogen bonding parameter δh of 10 to 20. By ensuring that these ranges are satisfied, the components of the colored resin particles can be blended more uniformly, the particle shape can be stabilized and the stability over time can be improved, and the color development and the abrasion resistance can be further improved.

Examples of the acidic group of the acidic compound include a phosphoric acid group, carboxyl group, sulfonic acid group, phosphate ester group, sulfate ester group, nitrate ester group, phosphorous acid group, phosphonic acid group and sulfinic acid group. Any one of these groups, or a combination of two or more groups, may be included within each molecule. The acidic compound preferably has two or more acidic groups within each molecule.

The acidic compound may be an oligomer, a polymer or a low-molecular weight compound.

Examples of the oligomer or polymer include poly(meth)acrylic-based resins, polyester-based resins, polyvinyl-based resins and polyether-based resins and the like, which may be used individually or in combinations. Further, copolymers of the monomers or oligomers that constitute these resins may also be used.

The acidic group may be derived from the monomer that constitutes the oligomer or polymer, thereby introducing an acidic group bonded to the main chain or side chain of each structural unit. Examples include copolymers or the like of a (meth)acrylate ester and (meth)acrylic acid. In such cases, carboxyl groups are introduced in accordance with the proportion of (meth)acrylic acid used. Further examples include copolymers of a (meth)acrylate ester and an acid-phosphoxy-(meth)acrylate. In such cases, phosphoric acid groups are introduced.

Further, the acidic groups may also be introduced by phosphorylation of an oligomer or polymer. In such cases, phosphoric acid groups are introduced in accordance with the positions and proportion of hydroxyl groups. When the oligomer or polymer has hydroxyl groups at both terminals, phosphoric acid groups are introduced at both terminals of the oligomer or polymer, meaning the acidic compound has a total of two phosphoric acid groups.

When the acidic compound is an oligomer or a polymer, the weight-average molecular weight is preferably within a range from 500 to 10,000, and more preferably from 1,000 to 5,000.

Specific examples of the oligomer or polymer for the acidic compound include phosphate ester compounds, including polyoxyalkyl phosphate esters such as polyoxyethylene alkyl phosphate esters and polyoxyethylene polyoxypropylene phosphate esters, and polyether polyester phosphate esters; alkyl polyphosphonic acids; and carboxyl group-containing (meth)acrylic polymers. These compounds may be used individually, or a plurality of compounds may be combined.

Low-molecular weight compounds such as phosphate esters, sulfate esters, and 1-hydroxyethane-1,1-diphosphonic acid and the like may also be used as the acidic compound.

The acidic compound preferably has an acid value. The acid value of the acidic compound is preferably at least 30 mgKOH/g, more preferably 60 mgKOH/g or higher, and even more preferably 90 mgKOH/g or higher.

Here, the acid value describes the number of milligrams of potassium hydroxide needed to neutralize all of the acidic components within 1 g of the non-volatile fraction of the compound. This definition also applies below.

Among the various possibilities, liquid organic compounds having at least one of a phosphoric acid group, a phosphonic acid group, a phosphate ester group and a carboxyl group, and having an acid value of at least 30 mgKOH/g are preferable, and compounds having one or more phosphoric acid groups are particularly preferred. Further, acidic compounds having phosphoric acid groups at both terminals of the compound are particularly desirable.

Examples of commercially available products that can be used as the acidic compound include DISPERBYK 102, 110, 111 (all product names) manufactured by BYK-Chemie Japan K.K., TEGO Dispers 655 manufactured by Tomoe Engineering Co., Ltd., Efka 6230 manufactured by Efka Chemicals B.V., PH-210 manufactured by Chelest Corporation, ARUFON UC3510 manufactured by Toagosei Co., Ltd., and CM292P manufactured by Unichemical Co., Ltd.

DISPERBYK 111 is a phosphate ester compound of a block copolymer of ethylene glycol and polycaprolactone, and has phosphoric acid groups at both terminals of the copolymer.

The acidic compound is preferably added in an amount of 0.1 to 50 mass %, and more preferably 1 to 40 mass %, relative to the total mass of the colored resin particles. This enables the uniformity and stability of the colored resin particle components to be maintained, while avoiding any effects on other raw materials.

Colorant

The colorant incorporated in the colored resin particles may be either a pigment or a dye, or a combination of the two. Details are described below.

From the viewpoints of the coloring properties and the uniformity of the components, the colorant is preferably added in an amount of 0.1 to 50 mass %, and more preferably 1 to 40 mass %, relative to the total mass of the colored resin particles.

Plasticizer

The colored resin particles may also include a plasticizer. The plasticizer is preferably a liquid organic compound having no acidic groups or basic groups. Liquid organic compounds having no acidic groups can be used particularly favorably as the plasticizer.

The plasticizer lowers the softening region of the thermoplastic solid resin A and imparts plasticity, and therefore by adding the plasticizer when the thermoplastic solid resin A and the colorant of the colored resin particles are mixed, the thermoplastic solid resin A and the colorant can be mixed together more uniformly. This enables the components of the colored resin particles to be blended more uniformly. As a result, the particle size of the colored resin particles can be reduced and the viscosity of the dispersion can be lowered, thereby contributing to improved rub fastness for the printed items.

The melting point of the plasticizer is preferably 23° C. or lower, more preferably 15° C. or lower, and even more preferably 0° C. or lower. This enables the thermoplastic solid resin A and the colorant of the colored resin particles to be mixed together more uniformly.

The plasticizer may be a low-molecular weight compound, a polymer compound, or a combination thereof.

Examples of compounds that can be used as the low-molecular weight compound include alcohols, esters, and ethers and the like.

For the alcohols, lower polyhydric alcohols and/or higher polyhydric alcohols can be used favorably. The number of hydroxyl groups in these alcohols is preferably from 1 to 10.

The carbon number of the lower polyhydric alcohols is preferably from 4 to 6.

Specific examples of the lower polyhydric alcohols include diols such as 1,5-pentanediol, 1,6-hexanediol and 3-methyl-1,5-pentanediol.

The carbon number of the higher polyhydric alcohols is preferably from 10 to 250.

Specific examples of the higher polyhydric alcohols include polyols such as castor oil polyols.

For the esters, low-molecular weight esters can be used favorably.

The carbon number of such low-molecular weight esters is preferably from 8 to 30.

Specific examples of the low-molecular weight esters include diisononyl phthalate, di-2-ethylhexyl adipate and diisononyl adipate.

Polymer compounds such as polyesters, polyethers, epoxy resins and (meth)acrylic polymers that are liquid at room temperature can also be used favorably as the plasticizer.

The weight-average molecular weight of these polymer compounds is preferably from 300 to 8,000, and more preferably from 1,000 to 5,000. This enables a good balance to be achieved between the shape stability and the plasticity of the colored resin particles.

Examples of the polyesters include polyester polyols obtained by subjecting a low-molecular weight polyol and a dibasic acid to an esterification reaction, polycaprolactone, and poly-β-methyl-δ-valerolactone and the like.

Specific examples of the polyester polyols include adipic acid-diethylene glycol (AA-DEG), adipic acid-neopentyl glycol (AA-NPG), and adipic acid-trimethylolpropane/diethylene glycol (AA-TMP/DEG).

Examples of the polyethers include polyether polyols such as polyethylene glycol, polyoxypropylene glycol and poly(oxytetramethylene) glycol.

Examples of the epoxy resins include bisphenol A epoxy resins and bisphenol F epoxy resins.

Examples of commercially available epoxy resins that can be used include jER 807, 825 and 828 (manufactured by Mitsubishi Chemical Corporation), EPICLON 830 and 840 (manufactured by DIC Corporation), and ADEKA Resin EP-4000, 4100 and EP-4901 (manufactured by ADEKA Corporation).

Examples of compounds that can be used as the (meth) acrylic polymer include not only (meth)acrylic resins having methacrylic units and/or acrylic units, but also copolymers having other units besides the methacrylic units and/or acrylic units. For example, vinyl acetate units and styrene units and the like can be used as other monomers.

Examples of commercially available (meth)acrylic polymers include ARUFON UP-1010, ARUFON UP-1080, ARUFON UP-1190, ARUFON UH-2000, ARUFON UH-2190, ARUFON UH-2041, ARUFON UG-4010 and ARUFON US-6100, all manufactured by Toagosei Co., Ltd.

These plasticizers may be used individually, or combinations of two or more plasticizers may be used.

The blend amount of the plasticizer is preferably from 5 to 40 mass % relative to the total mass of the colored resin particles.

The colored resin particles may also contain one or more other resins besides the thermoplastic solid resin A described above, provided that the effects of the present invention are not impaired. As described below in relation to the method for producing the colored resin particle dispersion, examples of these other resins include pigment dispersants and additives and the like.

From the viewpoint of the alcohol resistance, resins having a polar parameter δp outside a range from 2.5 to 11 and a hydrogen bonding parameter δh outside a range from 5 to 11 preferably constitute not more than 30 mass % of the total mass of the colored resin particles, and it is more preferable that the colored resin particles contains essentially none of these types of resins.

The average particle size of the colored resin particles is preferably not more than about 10 μm, and is more preferably 5 μm or less, and even more preferably 1 μm or less. The average particle size of the colored resin particles may be adjusted appropriately in accordance with the type of recording medium, and for example in order to improve the color development and fixability for printed items using coated paper, this average particle size is preferably about 100 to 500 nm, and more preferably not more than 300 nm. Moreover, from the viewpoint of inhibiting show-through on printed items using plain paper, the average particle size is preferably not more than 200 nm, and more preferably 150 nm or less.

Here, the average particle size of the colored resin particles refers to the volume-based average particle size determined by a dynamic scattering method, and can be measured, for example, using a dynamic light scattering particle size distribution analyzer LB-500 manufactured by Horiba, Ltd. This also applies below.

(Colored Resin Particle Dispersion)

The colored resin particle dispersion according to one embodiment of the present invention comprises a non-aqueous solvent and a basic dispersant in addition to the colored resin particles described above. The non-aqueous solvent and the basic dispersant are as described below in relation to the method for producing the colored resin particle dispersion. The non-aqueous solvent is preferably a solvent capable of dispersing the colored resin particles. The basic dispersant is added for the purpose of dispersing the colored resin particles in the non-aqueous solvent.

In the colored resin particle dispersion according to this embodiment, the amount of the colored resin particles relative to the total mass of the dispersion is preferably at least 1 mass %, more preferably 5 mass % or greater, and even more preferably 10 mass % or greater. This enables the dispersion to exhibit superior coloring properties as an ink, and also reduces the amount of solvent, thus enhancing the drying properties.

On the other hand, the amount of the colored resin particles relative to the total mass of the dispersion is preferably not more than 50 mass %, and is more preferably 40 mass % or less, and even more preferably 30 mass % or less. This enables the dispersibility and storage stability to be enhanced.

(Method for Producing Colored Resin Particle Dispersion)

Examples of the method used for producing the colored resin particle dispersion of the present embodiment are described below. However, the colored resin particle dispersion according to the present embodiment is not limited to dispersions produced using the following production methods.

Methods for preparing the colored resin particle dispersion can be broadly classified into chemical methods and physicochemical methods. Examples of the chemical methods include interfacial polycondensation methods, interfacial reaction methods (in situ polymerization methods), and in-liquid cured coating methods (orifice methods). Examples of the physicochemical methods include in-liquid drying methods (in-water drying methods and in-oil drying methods), coacervation methods, and fusion-dispersion-cooling methods.

The colored resin particle dispersion according to the present embodiment can be prepared, for example, using one of the physicochemical methods mentioned above, and a fusion-dispersion-cooling method can be used particularly favorably.

By using a fusion-dispersion-cooling method, the components described above can be used to prepare colored resin particles having a small average particle size and a narrow particle size distribution, and a colored resin particle dispersion having a low viscosity can be prepared. As a result, an ink that is particularly suited to inkjet discharge can be obtained, and an inkjet ink having excellent rub fastness can be obtained.

Further, by using a fusion-dispersion-cooling method, because a non-polar solvent is not used in the dispersed phase, the step of removing the non-polar solvent becomes unnecessary.

A colored resin particle dispersion prepared using a fusion-dispersion-cooling method can be obtained by preparing a resin emulsion by dispersing, in a heated and melted state, a dispersion phase containing the colorant, the thermoplastic solid resin A and the acidic compound, within a continuous phase containing the non-aqueous solvent and the basic dispersant, and then cooling this resin emulsion.

In order to ensure stable preparation of the resin emulsion, the basic dispersant preferably has a higher solubility in the non-aqueous solvent than in the thermoplastic solid resin A. Further, in order to stabilize the shape of the colored resin particles, each of the colorant and the acidic compound preferably has a higher solubility in the thermoplastic solid resin A than in the non-aqueous solvent.

Continuous Phase

The continuous phase contains the non-aqueous solvent and the basic dispersant.

Both non-polar organic solvents and polar organic solvents can be used as the non-aqueous solvent. These solvents may be used individually, or a combination of solvents may be used. In the present invention, the use of a water-insoluble organic solvent that does not mix uniformly with an equal volume of water at one atmosphere and 20° C. is preferred.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based and naphthene-based non-aqueous solvents, and examples of commercially available products that can be used favorably include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JX Nippon Oil & Energy Corporation); and Isopar G, Isopar H, Isopar L, Isopar M, Exxsol D40, Exxsol D60, Exxsol D80, Exxsol D95, Exxsol D110 and Exxsol D130 (all manufactured by TonenGeneral Sekiyu K.K.).

Examples of preferred aromatic hydrocarbon solvents include Grade Alkene L and Grade Alkene 200P (both manufactured by JX Nippon Oil & Energy Corporation), and Solvesso 100, Solvesso 150, Solvesso 200 and Solvesso 200ND (all manufactured by TonenGeneral Sekiyu K.K.).

The initial boiling point of the petroleum-based hydrocarbon solvent is preferably at least 100° C., more preferably 150° C. or higher, and even more preferably 200° C. or higher. The initial boiling point can be measured in accordance with JIS K0066 "Test Methods for Distillation of Chemical Products".

Examples of preferred polar organic solvents include fatty acid ester-based solvents, higher alcohol-based solvents and higher fatty acid-based solvents.

Specific examples include fatty acid ester-based solvents having a carbon number of 13 or higher, and preferably a carbon number of 16 to 30, within each molecule, such as isononyl isononanoate, isodecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having a carbon number of 6 or higher, and preferably a carbon number of 12 to 20, within each molecule, such as isomyristyl alcohol, isopalmityl alcohol, isostearyl alcohol, oleyl alcohol, isoeicosyl alcohol and decyltetradecanol; and higher fatty acid-based solvents having a carbon number of 12 or higher, and preferably a carbon number of 14 to 20, within each molecule, such as lauric acid, isomyristic acid, palmitic acid, isopalmitic acid, α-linolenic acid, linoleic acid, oleic acid and isostearic acid.

The boiling point of the polar organic solvent such as the fatty acid ester-based solvent, higher alcohol-based solvent or higher fatty acid-based solvent is preferably at least 150° C., more preferably 200° C. or higher, and even more preferably 250° C. or higher. Non-aqueous solvents which do not display a boiling point are deemed to be included in non-aqueous solvents having a boiling point of 250° C. or higher.

These non-aqueous solvents may be used individually, or two or more solvents may be combined, provided they form a single phase. Further, the solvent may also include other organic solvents, provided they can form a single phase with the non-aqueous solvent being used.

The non-aqueous solvent preferably has a Hansen solubility parameter (HSP value) of 14 to 18 MPa$^{1/2}$. Further, the non-aqueous solvent preferably has a dispersion parameter $\delta d$ of 12 to 20, a polar parameter $\delta p$ of 0 to 4, and a hydrogen bonding parameter $\delta h$ of 0 to 4.

By ensuring that the Hansen solubility parameters of the non-aqueous solvent satisfy the above ranges, and that the Hansen solubility parameters of the thermoplastic solid resin A of the colored resin particles satisfy the ranges described above, the dispersion stability of the colored resin particles in the non-aqueous solvent can be improved. Further, when printing is performed using the colored resin particle dispersion, separation of the colored resin particles and the non-aqueous solvent on the paper can be accelerated, thereby enhancing the fixability of the colored resin particles to the paper and improving the abrasion resistance. This type of fixability effect manifests particularly strongly when printing to relatively impermeable papers such as coated papers.

The 50% distillation point of the non-aqueous solvent is preferably not higher than 400° C., and is more preferably 300° C. or lower. On the other hand, in order to prevent volatilization of the non-aqueous solvent and maintain the stability of the colored resin particle dispersion, the lower limit for the 50% distillation point of the non-aqueous solvent is preferably at least 100° C., and more preferably 150° C. or higher.

The basic dispersant is a dispersant having a basic group. The basic dispersant preferably has a higher solubility in the non-aqueous solvent than in the thermoplastic solid resin A.

The solubility of the basic dispersant in the thermoplastic solid resin A at 23° C. is preferably not more than 3 g/100 g, and more preferably 0.5 g/100 g or less. Further, the solubility of the basic dispersant in the non-aqueous solvent at 23° C. is preferably at least 3 g/100 g, and more preferably 5 g/100 g or greater. It is even more preferable that the basic dispersant is selected so that, in the blend proportions used in the resin emulsion, the basic dispersant dissolves essentially completely in the non-aqueous solvent, and undergoes essentially no dissolution in the thermoplastic solid resin A.

The basic dispersant is preferably a compound for which, when the basic dispersant is dissolved in the non-aqueous solvent, the oxidation-reduction potential (ORP value) decreases as the concentration of the basic dispersant increases.

For example, when the basic dispersant is dissolved in a solvent capable of dissolving the basic dispersant, it is preferable that the ORP value when the basic dispersant is dissolved in an amount of 5.0 mass % is lower than the ORP value when the basic dispersant is dissolved in an amount of 0.5 mass %.

Further, the ORP value when the basic dispersant is dissolved in dodecane in an amount of 5.0 mass % is preferably not higher than 0 mV.

On the other hand, if the basic dispersant includes an acidic group as well as the basic group, then the compound can still be used favorably as the basic dispersant, despite containing an acidic group, provided the ORP value exhibits this tendency to decrease. It is preferable that the basic dispersant does not contain an acidic group.

Examples of the basic group of the basic dispersant include an amino group, amide group and pyridyl group, and among these, an amino group is preferable. Further, other examples of the basic group of the basic dispersant include nitrogen-containing functional groups having a urethane linkage or the like. Furthermore, nitrogen-containing structural units such as a urethane linkage may also be introduced into the basic dispersant.

Examples of the basic dispersant include modified polyurethanes, basic group-containing poly(meth)acrylates, basic group-containing polyesters, polyesteramines, quaternary ammonium salts, alkylamine salts such as stearylamine acetate, and fatty acid amine salts. These compounds may be used individually, or a plurality of compounds may be combined.

Examples of commercially available basic dispersants include:

Solsperse 13940 (a polyester amine-based dispersant), 17000 and 18000 (fatty acid amine-based dispersants), and 11200, 22000, 24000 and 28000 (all product names), manufactured by The Lubrizol Corporation, DISPERBYK 116, 2096 and 2163 (all product names), manufactured by BYK-Chemie Japan K.K., ACETAMIN 24 and 86 (alkylamine salt-based dispersants) (both product names), manufactured by Kao Corporation, and DISPARLON KS-860 and KS-873N4 (high-molecular weight polyester amine salts) (both product names), manufactured by Kusumoto Chemicals, Ltd.

The basic dispersant preferably has a base value. The base value of the basic dispersant is preferably at least 1 mgKOH/g, more preferably 10 mgKOH/g or higher, and even more preferably 15 mgKOH/g or higher. This ensures that a fine and stable colored resin particle dispersion can be prepared.

Here, the base value describes the number of milligrams of potassium hydroxide equivalent to the amount of hydrochloric acid needed to neutralize all of the basic components contained within 1 g of the non-volatile fraction of the compound. This definition also applies below.

A (meth)acrylic block polymer having basic groups can be used particularly favorably as the basic dispersant. Here, the term "(meth)acrylic block polymer" means both methacrylic block polymers and acrylic block polymers, and includes polymers containing only methacrylic units or acrylic units, and copolymers containing both methacrylic units and acrylic units.

By using a (meth)acrylic block polymer having basic groups as the basic dispersant, the viscosity of the colored resin particle dispersion can be suppressed to a low level, and the average particle size of the colored resin particles can be kept small. As a result, an ink that is particularly suited to inkjet discharge can be obtained.

One example of a preferred (meth)acrylic block polymer having basic groups is a block copolymer having a first block containing units having an alkyl group with a carbon number of 12 or greater, and a second block containing units having an amino group.

With this block copolymer, because the alkyl group portions exhibit good solvent affinity and the amino group portions exhibit good affinity with the colored resin particles, the dispersibility of the colored resin particles can be enhanced. Further, the emulsion stability when preparing the resin emulsion can also be enhanced. Because of the block polymer structure, the alkyl group portions are localized, meaning the alkyl group portions are readily orientated on the solvent side, and the solvent affinity can be further enhanced.

The alkyl group with a carbon number of 12 or greater may be either a linear or branched alkyl group, and specific examples include a dodecyl group, cetyl group, stearyl group, behenyl group, isododecyl group and isostearyl group.

These alkyl groups with a carbon number of 12 or greater may be incorporated in the first block either individually, or in combinations of two or more different groups.

Examples of groups that can be used as the amino group include groups represented by a general formula —$NR^1R^2$, wherein each of $R^1$ and $R^2$ independently represents a hydrogen atom, a hydrocarbon group having a carbon number of 18 or less, or an alkanol group having a carbon number of 8 or less or the like.

Examples of the hydrocarbon group having a carbon number of 18 or less include chain-like hydrocarbon groups such as a methyl group, ethyl group, propyl group and butyl group, and cyclic hydrocarbon groups such as a cyclohexyl group and phenyl group. Examples of the alkanol group having a carbon number of 8 or less include an ethanol group and an isopropanol group.

The amino group is preferably a dialkanolamino group represented by the general formula —$N(HOR)_2$ (wherein R represents a divalent hydrocarbon group).

Specific examples of the amino group include:

a primary amino group;

secondary amino groups such as a methylamino group, ethylamino group, propylamino group, butylamino group, cyclohexylamino group and phenylamino group; and tertiary amino groups such as a dimethylamino group, diethylamino group, dipropylamino group, dibutylamino group, dicyclohexylamino group, diphenylamino group and pyridinyl group.

Further examples include alkanolamino groups such as a monomethylethanolamino group, diethanolamino group and diisopropanolamino group.

These groups may be used individually, or combinations of two or more groups may be used.

The molar ratio between the first block and the second block is preferably from 20:80 to 90:10, and more preferably from 30:70 to 70:30.

The (meth)acrylic block polymer having basic groups may be a block copolymer having one of each of the first block and the second block bonded to each other, or may be a block copolymer in which pluralities of the first block and the second block are bonded together in an alternating manner.

The proportion of units having an alkyl group with a carbon number of 12 or greater relative to all of the units of the first block is preferably at least 50 mol %, more preferably 55 mol % or greater, and even more preferably 60 mol % or greater. In order to improve the solvent affinity of the first block, the first block is preferably composed mainly of units having an alkyl group with a carbon number of 12 or greater.

The proportion of units having an amino group relative to all of the units of the first block is preferably less than 10 mol %, more preferably 5 mol % or less, and even more preferably 1 mol % or less, and it is particularly desirable that the first block contains essentially no units having an amino group. This enables the alkyl group portions of the first block to adopt an elongated configuration, thereby enhancing the solvent affinity.

The proportion of units having an amino group relative to all of the units of the second block is preferably at least 10 mol %, more preferably 20 mol % or greater, and even more preferably 30 mol % or greater. This enables the amino group portions to enhance the affinity with the colored resin particles.

On the other hand, the proportion of units having an amino group relative to all of the units of the second block is preferably not more than 95 mol %, and more preferably 70 mol % or less. This optimizes the orientation of the (meth)acrylic block polymer having basic groups relative to the colored resin particles, and means appropriate dispersibility can be obtained for the colored resin particles.

The proportion of units having an alkyl group with a carbon number of 12 or greater relative to all of the units of the second block is preferably from 10 to 90 mol %, more preferably from 20 to 80 mol %, and even more preferably from 30 to 70 mol %. However, the second block may contain no units having an alkyl group with a carbon number of 12 or greater.

The first and second blocks may each contain other groups besides the alkyl group with a carbon number of 12 or more and the amino group respectively. Examples of these other groups include alkyl groups having a carbon number of less than 12, and a benzyl group and the like.

One example of a preferred (meth)acrylic polymer having basic groups is a block copolymer having a block A of a monomer mixture a containing an alkyl (meth)acrylate (A) having an alkyl group with a carbon number of 12 or greater (hereafter also referred to as "monomer (A)"), and a block B of a monomer mixture b containing a reactive (meth) acrylate (B) having a functional group that can react with an amino group (hereafter also referred to as "monomer (B)") (hereafter this block copolymer is also referred to as simply the "(meth)acrylic block polymer"), wherein the functional group that can react with an amino group is reacted with an amino alcohol to introduce an amino group. Hereafter this block copolymer is sometimes referred to as simply an "amine-modified (meth)acrylic block polymer".

In this amine-modified (meth)acrylic block polymer, the introduced amino alcohol portions function as resin emulsion interface adsorption groups, and also as adsorption groups for the colored resin particles, whereas the alkyl groups with a carbon number of 12 or greater exhibit good solvent affinity, and can enhance the emulsion stability of the resin emulsion and the dispersibility of the colored resin particles.

Examples of the alkyl (meth)acrylate (A) having an alkyl group with a carbon number of 12 or greater include dodecyl (meth)acrylate, cetyl (meth)acrylate, stearyl (meth)acrylate, behenyl (meth)acrylate, isododecyl (meth)acrylate, and isostearyl (meth)acrylate. A plurality of these compounds may also be included. The carbon number of the alkyl group is preferably from 12 to 25.

Preferred examples of the functional group that can react with an amino group in the reactive (meth)acrylate (B) include a glycidyl group, vinyl group, and (meth)acryloyl group. An example of the monomer (B) having a glycidyl group is glycidyl (meth)acrylate, and examples of the monomer (B) having a vinyl group include vinyl (meth)acrylate and 2-(2-vinyloxyethoxy)ethyl (meth)acrylate. Examples of the monomer (B) having a (meth)acryloyl group include dipropylene glycol di(meth)acrylate and 1,6-hexanediol di(meth)acrylate. A plurality of these compounds may also be included.

The monomer mixtures a and b may each include a copolymerizable monomer (C) other than the aforementioned monomers (A) and (B), provided that the effects of the present invention are not impaired.

Examples of this monomer (C) include styrene-based monomers such as styrene and α-methylstyrene; vinyl ether-based monomers such as vinyl acetate, vinyl benzoate and butyl vinyl ether; as well as maleate esters, fumarate esters, acrylonitrile, methacrylonitrile and α-olefins. Further, alkyl (meth)acrylates in which the alkyl chain length has a carbon number of less than 12, such as 2-ethylhexyl (meth)acrylate, isooctyl (meth)acrylate and tert-octyl (meth)acrylate can also be used. Furthermore, (meth)acrylates having a β-diketone group or a 3-keto acid ester group, including acetoacetoxyalkyl (meth)acrylates such as 2-acetoacetoxyethyl (meth)acrylate, hexadione (meth)acrylate, and acetoacetoxyalkyl (meth)acrylamides such as acetoacetoxyethyl (meth)acrylamide can also be used. These monomers may be used individually, or a combination of two or more monomers may be used.

Examples of the amino alcohol include monomethylethanolamine, diethanolamine and diisopropanolamine. Among the various possibilities, from the viewpoint of providing two hydroxyl groups and thereby promoting the adsorption of the compound to the interface of the resin emulsion, a dialkanolamine (secondary alkanolamine) represented by a general formula $(HOR)_2NH$ (wherein R represents a divalent hydrocarbon group) is preferable. A combination of a plurality of these amino alcohols may also be used.

In order to enable the introduction of amino groups and ensure satisfactory dispersion of the colored resin particles, this amino alcohol is preferably reacted in an amount within a range from 0.05 to 1 molar equivalent, and more preferably from 0.5 to 1 molar equivalent, per molar equivalent of the functional group that can react with an amino group in the aforementioned monomer (B). An amount of the amino alcohol of less than 1 molar equivalent means some unreacted functional groups will remain within the monomer (B), but it is thought that these residual functional groups function as adsorption groups for the colored resin particles.

One example of the amine-modified (meth)acrylic block polymer is an A-B block copolymer in which a block A comprising mainly units based on the monomer (A) and a block B comprising mainly units based on the monomer (B) are bonded together in an A-B configuration.

Furthermore, from the viewpoints of the solubility between the dispersant and the solvent, and the adsorption to the pigment, the block polymer dispersant may also be an A-AB block copolymer in which a block A comprising mainly units based on the monomer (A) and a block AB having both units based on the monomer (B) and units based on the monomer (A) are bonded together in an A-AB configuration, or an A-B-A block copolymer in which a block A comprising mainly units based on the monomer (A) and a block B comprising mainly units based on the monomer (B) are bonded together in an A-B-A configuration. The number of linked blocks is not limited to the above configurations.

From the viewpoint of the solubility in non-aqueous solvents, and particularly non-polar solvents, an A-AB block copolymer or an A-B-A block copolymer is preferable.

In one example of a method of synthesizing the amine-modified (meth)acrylic block polymer, in a first stage, one of the monomer mixture a containing the monomer (A) and the monomer mixture b containing the monomer (B) is polymerized to obtain a first block, in a second stage, the other monomer mixture is polymerized in the presence of this first block, thereby linking a block of the other monomer mixture to the terminal of the first block and yielding a polymerized (meth)acrylic block polymer, and in a subsequent third stage, diethanolamine is reacted with this (meth)acrylic block polymer to obtain the amine-modified (meth)acrylic block polymer.

In the second stage, the (meth)acrylic block polymer is preferably polymerized by a living polymerization method, which is a type of precision polymerization. The living polymerization method preferably employs a living radical polymerization such as an atom transfer radical polymerization (ATRP), a nitroxide radical-mediated living radical polymerization (NMP) or a reverse addition fragmentation chain transfer polymerization (RAFT polymerization) or the like.

RAFT polymerization is characterized by the use of a polymerization initiator and a reverse addition fragmentation chain transfer agent (RAFT agent), and is a method that enables living characteristics to be achieved in a radical polymerization. Examples of compounds that can be used as the RAFT agent include thiocarbonylthio compounds such as dithioesters, dithiocarbamates, trithiocarbonates and xanthates. Examples of commercially available products that can be used favorably include 4-cyano-4-(phenylcarbonothioylthio)pentanoic acid (722995, manufactured by Sigma-Aldrich Co. LLC.) and 2-cyano-2-propyl dodecyl trithiocarbonate (723037, manufactured by Sigma-Aldrich Co. LLC.).

Although there are no particular limitations on the molecular weight (weight-average molecular weight) of the amine-modified (meth)acrylic block polymer, if the resulting dispersion is to be used as an inkjet ink, then from the viewpoint of ink dischargeability, the molecular weight is preferably about 10,000 to 100,000, and more preferably about 10,000 to 80,000. Moreover, superior dispersion stability can be achieved when the molecular weight is about 20,000 to 50,000.

Another example of the (meth)acrylic block polymer having basic groups is a block copolymer having a block A of a monomer mixture a containing an alkyl (meth)acrylate (A) having an alkyl group with a carbon number of 12 or greater, and a block B of a monomer mixture b containing a reactive (meth)acrylate (B) having an amino group.

In this example, (meth)acrylates having a tertiary amino group can be used favorably as the (meth)acrylate (B) having an amino group. Specifically, dimethylaminoethyl (meth)acrylate, diethylaminoethyl (meth)acrylate, dimethylaminopropyl methacrylamide, or dipropylaminoethyl (meth)acrylamide or the like may be used individually, or in combinations containing a plurality of these compounds.

This (meth)acrylic block polymer having basic groups can be obtained by a method in which, in a first stage, one of the monomer mixture a containing the monomer (A) and the monomer mixture b containing the monomer (B) having an amino group is polymerized to obtain a first block, and in a second stage, the other monomer mixture is polymerized in the presence of this first block, thereby linking a block of the other monomer mixture to the terminal of the first block.

From the viewpoints of the stability of the emulsion and the dispersibility of the colored resin particles, the amount of the basic dispersant within the continuous phase is preferably from 0.1 to 15 mass %, and more preferably from 1 to 10 mass %, relative to the total mass of the continuous phase.

From the viewpoint of the dispersibility of the colored resin particles, the amount of the basic dispersant is preferably from 0.1 to 20 mass %, and more preferably from 1 to 15 mass %, relative to the total mass of the colored resin particle dispersion.

Other optional components such as antioxidants, surface tension regulators and antifoaming agents may be added to the continuous phase, provided they do not impair the effects of the present invention.

Dispersed Phase

The dispersed phase contains the colorant, the thermoplastic solid resin A and the acidic compound.

Details regarding the thermoplastic solid resin A are as described above.

The solubility of this thermoplastic solid resin A in the non-aqueous solvent of the continuous phase at 23° C. is preferably not more than 3 g/100 g, more preferably not more than 1 g/100 g, and even more preferably 0.5 g/100 g or less. It is particularly desirable that, in the blend proportions used in the resin emulsion, the thermoplastic solid resin A is essentially insoluble in the non-aqueous solvent.

The amount of the thermoplastic solid resin A in the dispersed phase may be adjusted appropriately in accordance with the aforementioned blend proportion of the colored resin particles.

The amount of the thermoplastic solid resin A relative to the total mass of the colored resin particle dispersion is preferably from 0.1 to 20 mass %, and more preferably from 1 to 15 mass %. This enables the colorant and the acidic compound to be blended uniformly into the thermoplastic solid resin A, and enables the particle shape to be stabilized.

Details regarding the acidic compound are as described above.

The solubility of the acidic compound in the thermoplastic solid resin A at 23° C. is preferably at least 1 g/100 g, and more preferably 2 g/100 g or greater. Further, the solubility of the acidic compound in the non-aqueous solvent of the continuous phase at 23° C. is preferably not more than 3 g/100 g, more preferably 1 g/100 g or less, and even more preferably 0.5 g/100 g or less. It is even more preferable that, in the blend proportions used in the resin emulsion, the acidic compound dissolves essentially completely in the thermoplastic solid resin A, and undergoes essentially no dissolution in the non-aqueous solvent.

Here, the solubility of a sample in the thermoplastic solid resin A can be evaluated by 1) uniformity mixing the sample in the thermoplastic solid resin A with the thermoplastic solid resin A melted, 2) spreading it on a glass plate or the like, and cooling it to the room temperature (23° C.), and 3) observing whether the thermoplastic solid resin A and the sample are separated in the film mixture or not.

Alternatively, the solubility of a sample in the thermoplastic solid resin A can be evaluated by 1) uniformity dissolving the sample and the thermoplastic solid resin A in a solvent wherein the sample and the thermoplastic solid resin A can be dissolved, 2) spreading it on a glass plate or the like, and evaporating the solvent, and 3) observing whether the thermoplastic solid resin A and the sample are separated in the film mixture or not.

This evaluation about the solubility of a sample in the thermoplastic solid resin A also applies below.

The amount of the acidic compound in the dispersed phase may be adjusted appropriately in accordance with the aforementioned blend proportion of the colored resin particles.

The amount of the acidic compound relative to the total mass of the colored resin particle dispersion is preferably from 0.1 to 20 mass %, and more preferably from 1 to 15 mass %. This enables the abrasion resistance of the printed items to be further enhanced, reduces the particle size of the colored resin particles, and enables the viscosity of the dispersion to be lowered.

The mass ratio between the acidic compound and the colorant preferably satisfies (mass of acidic compound)/ (mass of colorant)≥0.5. When this range is satisfied, mixing and stirring of the continuous phase and the dispersed phase is able to provide an resin emulsion having excellent emulsion stability.

The colorant may be a dye or a pigment, or a combination thereof.

The solubility of the colorant in the non-aqueous solvent of the continuous phase at 23° C. is preferably not more than 3 g/100 g, and is more preferably 1 g/100 g or less, and even more preferably 0.5 g/100 g or less. It is even more preferable that the colorant is selected so that, in the blend proportions used in the resin emulsion, the colorant is essentially insoluble in the non-aqueous solvent of the continuous phase.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The average particle size of the pigment is preferably 300 nm or less, and more preferably 200 nm or less. This ensures that the dispersibility of the pigment within the dispersed phase can be maintained favorably, and also ensures that the particle size of the final colored resin particles is appropriate.

When a pigment is used for the colorant, solid chips having the pigment already dispersed in the aforementioned thermoplastic solid resin A can be used. In such a case, the affinity between the pigment and the resin is improved, and the abrasion resistance can be further enhanced. Further, such solid chips are also advantageous from the viewpoint of ink production. Examples of the method used for dispersing the pigment in the thermoplastic solid resin A include a method using a twin roll mill or the like.

When a pigment is used for the colorant, in order to ensure stable dispersion of the pigment within the dispersed phase, a pigment dispersant may be included in the dispersed phase.

An anionic dispersant, cationic dispersant or nonionic dispersant may be used as the pigment dispersant, and the dispersant may be selected appropriately in accordance with the other components of the emulsion. Further, the pigment dispersant may use a high-molecular weight compound or a low-molecular weight compound (surfactant).

Examples of the pigment dispersant include hydroxyl group-containing carboxylate esters, salts of high-molecular weight polycarboxylic acids, naphthalenesulfonic acid formalin condensate salts, polyoxyethylene alkyl phosphate esters, salts of long-chain polyaminoamides and high-molecular weight acid esters, salts of long-chain polyaminoamides and polar acid esters, polyester polyamines, stearylamine acetate, high-molecular weight unsaturated acid esters, polyoxyethylene nonylphenyl ethers, high-molecular weight copolymers, modified polyurethanes, and modified polyacrylates and the like.

These dispersants may be used individually, or a plurality of dispersants may be combined.

A compound that exhibits pigment dispersion properties, selected from among the acidic compounds described above, may be used as the anionic dispersant.

Examples of commercially available products that can be used as the acidic compound used as the anionic dispersant include DISPERBYK 102, 108, 110, 111 and 180 (all product names) manufactured by BYK-Chemie Japan K.K., TEGO Dispers 655 manufactured by Tomoe Engineering Co., Ltd., and Efka 6230 manufactured by Efka Chemicals B.V. All of these products exhibit good solubility in the thermoplastic solid resin A.

For the cationic dispersant, nitrogen-containing compounds having an amino group, amide group, pyridyl group, or urethane linkage or the like can be used favorably, and among such compounds, nitrogen-containing compounds having an amino group are preferable.

Examples of commercially available products that can be used as the cationic dispersant include Solsperse 71000 manufactured by The Lubrizol Corporation, and DISPERBYK 2155 and 9077 manufactured by BYK-Chemie Japan K.K. All of these products exhibit good solubility in the thermoplastic solid resin A.

When a cationic dispersant is used as the pigment dispersant, the base value of the cationic dispersant is preferably at least 1 mgKOH/g, more preferably 10 mgKOH/g or greater, and even more preferably 20 mgKOH/g or greater. This enhances the affinity with the pigment, and can improve the dispersion performance.

The blend amount of the pigment dispersant within the dispersed phase can be set as appropriate, but from the viewpoint of the pigment dispersibility, the mass ratio relative to 1 part of the pigment is preferably about 0.05 to 2.0 parts, more preferably from 0.1 to 1.0 parts, and even more preferably from 0.2 to 0.6 parts.

Any of the dyes typically used in this technical field can be used, and examples include basic dyes, acid dyes, direct dyes, soluble vat dyes, acid mordant dyes, mordant dyes, reactive dyes, vat dyes, sulfide dyes, metal complex dyes and salt-forming dyes. These dyes may be used individually, or a plurality of dyes may be combined.

Specific examples of the dyes include azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine-based dyes, metal phthalocyanine-based dyes, triarylmethane dyes, rhodamine dyes, sulforhodamine dyes, methine dyes, azomethine dyes, quinone dyes, triphenylmethane dyes, diphenylmethane dyes, and methylene blue and the like. These dyes may be used individually, or a plurality of dyes may be combined.

In a preferred configuration, by ensuring that the dye has a higher solubility in the thermoplastic solid resin A than in the non-aqueous solvent of the continuous phase, the dye can be dissolved in the thermoplastic solid resin A, enabling a stable colored resin particle dispersion to be provided.

The solubility of the dye in the thermoplastic solid resin A at 23° C. is preferably at least 0.5 g/100 g, and more preferably 1 g/100 g or greater. It is even more preferable that the dye is selected so that, in the blend proportions used in the resin emulsion, the dye dissolves essentially completely in the thermoplastic solid resin A.

Further, from the viewpoint of the water resistance of the colored resin particles, the dye is preferably an oil-soluble dye. Further, by using an acid dye, the basic dispersant is incorporated in the continuous phase and the acidic acid dye is incorporated in the dispersed phase, and therefore the resin dispersion can be better stabilized. A metal complex dye is particularly preferable.

Examples of these types of oil-soluble dyes include OIL Blue 613, OIL Yellow 107, and Spilit Black AB and ROB-B from the OIL Color series manufactured by Orient Chemical Industries Co., Ltd.

Further, specific examples of metal complex dyes that can be used include the VALIFAST Color series manufactured by Orient Chemical Industries Co., Ltd., including Valifast Black 3804, 3810 (solvent black 29), 3820, 3830, 3840 (solvent black 27) and 3870, Valifast Blue 1605, 1621, 2606, 2620 and 2670, Valifast Orange 3209 and 3210, Valifast Pink 2310N and 2312, Valifast Red 3304, 3311, 3312 and 3320, and Valifast Yellow 3108, 3170, 4120 and 4121;

the Orasol series manufactured by BASF Corporation, including Orasol Black RL1, Blue GN, Pink 5BLG and Yellow 2RLN; and the Aizen Spilon series manufactured by Hodogaya Chemical Co., Ltd., including Aizen Spilon Black BH and RLH, Aizen Spilon Violet RH, Aizen Spilon Red CBH and BEH, Aizen Spilon Yellow GRH, Aizen SPT Blue 26, Aizen SPT Blue 121, and Aizen SPN Yellow 510.

The amount of the colorant in the dispersed phase may be adjusted appropriately in accordance with the blend proportion of the aforementioned colored resin particles.

The amount of the colorant, reported as a combined amount of the pigments and dyes relative to the total mass of the colored resin particle dispersion, is preferably from 0.1 to 50 mass %, more preferably from 1 to 40 mass %, and even more preferably from 2 to 20 mass %. This enables the coloring properties of the colored resin particles to be adjusted to an appropriate level, and can stabilize the particle shape.

The dispersed phase may also include a plasticizer. In the present embodiment, the plasticizer is a liquid organic compound, and preferably has no acidic groups or basic groups. A liquid organic compound having no basic groups can be used particularly favorably as the plasticizer. Details relating to the plasticizer are as described above.

The solubility of the plasticizer in the thermoplastic solid resin A at 23° C. is preferably at least 3 g/100 g, more preferably 10 g/100 g or greater, and even more preferably 20 g/100 g or greater. Further, the solubility of the plasticizer in the non-aqueous solvent of the continuous phase at 23° C. is preferably not more than 3 g/100 g, more preferably 1 g/100 g or less, and even more preferably 0.5 g/100 g or less. It is even more preferable that, in the blend proportions used in the resin emulsion, the plasticizer dissolves essentially completely in the thermoplastic solid resin A, and undergoes essentially no dissolution in the non-aqueous solvent of the continuous phase.

The amount of the plasticizer in the dispersed phase may be adjusted appropriately in accordance with the blend proportion of the aforementioned colored resin particles The amount of the plasticizer relative to the total mass of the colored resin particle dispersion is preferably from 1 mass % to 20 mass %.

Other optional components such as antifoaming agents, antioxidants, surface tension regulators and crosslinking agents may be added to the dispersed phase, provided they do not impair the effects of the present invention.

Method of Preparing Dispersion

The method used for preparing the colored resin particle dispersion is not particularly limited, and the dispersion can be prepared by melting and dispersing the dispersed phase described above in the continuous phase described above to prepare a resin emulsion, and then cooling the resulting resin emulsion.

For example, the continuous phase and the dispersed phase can be prepared by mixing the various components described above. The dispersed phase can be prepared with the thermoplastic solid A in a heated and melted state.

Subsequently, the dispersed phase can be dispersed in the continuous phase by mixing and stirring the two phases while the dispersed phase is added dropwise in a heated state to the continuous phase, thus forming a resin emulsion. By cooling this resin emulsion, the thermoplastic solid resin A solidifies in a state encapsulating the colorant and the acidic compound, thus obtaining a colored resin particle dispersion.

The heating temperature is preferably a temperature capable of melting the thermoplastic solid resin A, and may be adjusted appropriately in accordance with the melting temperature of the thermoplastic solid resin A. For example, heating may be performed at a temperature within a range from 40 to 250° C., more preferably 60 to 200° C., and even more preferably from 80 to 180° C. This enables the thermoplastic solid resin A to be imparted with adequate fluidity, enabling the colorant and the acidic compound to be blended more uniformly. On the other hand, by ensuring the temperature is not too high, degeneration of the components caused by excessive heat can be prevented.

The mixing and stirring of the continuous phase and the dispersed phase can be performed using a wet dispersion device such as an ultrasonic homogenizer, a beads mill, a homomixer, or a high-pressure homogenizer.

Further, the resin emulsion may also be prepared by mixing and kneading the thermoplastic solid resin A and the colorant in advance to form solid chips, and then mixing these solid chips and the acidic compound, either in a single batch or a number of batches, into the continuous phase. By using this method, the colorant can be blended more uniformly into the thermoplastic solid resin A.

The mass ratio between the continuous phase and the dispersed phase in the resin emulsion can be adjusted within a range from 40:60 to 80:20.

In the colored resin particle dispersion, the average particle size of the colored resin particles is preferably as described above.

The average particle size of the colored resin particles can be controlled by altering factors such as the amount of the basic dispersant added to the continuous phase and/or the amount of the non-volatile fraction in the dispersed phase. By adding the acidic compound, the average particle size of the colored resin particles can be kept small.

Second Embodiment

A colored resin particle dispersion according to another embodiment of the present invention (hereafter sometimes referred to as simply "the dispersion") comprises colored resin particles, an acidic dispersant and a non-aqueous solvent, wherein the colored resin particles comprise a colorant, a thermoplastic solid resin and a liquid organic compound having a basic group, and the thermoplastic solid resin has a polar parameter $\delta p$ and a hydrogen bonding parameter $\delta h$ from the Hansen solubility parameters that satisfy $\delta p=2.5$ to $11.0$ and $\delta h=5.0$ to $12.0$ respectively.

Hereafter, the liquid organic compound having a basic group is sometimes referred to as simply "the basic compound". Further, the thermoplastic solid resin having the solubility characteristics described above is sometimes referred to as simply "the thermoplastic solid resin A".

According to this embodiment, a printed item can be provided which not only exhibits excellent rub fastness, but by using a thermoplastic solid resin having excellent alcohol resistance for the colored resin particles, also exhibits excellent alcohol resistance.

In the present embodiment, by including both the colorant and the basic compound in the colored resin particles, the rub fastness can be enhanced. Further, the basic compound enables more uniform blending of the components of the colored resin particles, and therefore the particle size of the colored resin particles can be reduced, the viscosity of the resulting ink can be lowered, and the image density of the printed items can be increased.

Further, by using a thermoplastic solid resin having water resistance in the colored resin particles, the water resistance of the printed items can also be enhanced.

Moreover, in the present embodiment, because the thermoplastic solid resin that constitutes the colored resin particles has the solubility characteristics described above, printed items having excellent alcohol resistance can be provided.

In the following description, descriptions of those items that are common to the first embodiment described above are omitted.

(Colored Resin Particles)

The colored resin particles in the present embodiment comprise a colorant, the thermoplastic solid resin A, and a liquid organic compound having a basic group (the basic compound).

With the exception of using the basic compound, these colored resin particles of the present embodiment are the same as those of the first embodiment described above.

Basic Compound

The colored resin particles also comprise a liquid organic compound having a basic group (the basic compound). Here, a liquid organic compound having a basic group describes an organic compound which is liquid at 23° C. and contains a basic group.

By adding the basic compound, the rub fastness and the color development properties of the printed items can be further improved. This is because the basic compound enables the colorant and the thermoplastic solid resin A to be blended more uniformly and stably.

Further, by adding the basic compound, the particle size of the colored resin particles can be reduced, and the viscosity of the dispersion can be lowered.

Furthermore, when a resin having superior alcohol resistance is used as the thermoplastic solid resin A, the abrasion resistance can sometimes deteriorate, but by adding the basic compound together with this thermoplastic solid resin A, the alcohol resistance and the abrasion resistance can be improved.

In order to ensure that the basic compound maintains a liquid state at room temperature, the melting point of the basic compound is preferably 23° C. or lower, and more preferably 15° C. or lower. Further, the carbon number of the basic compound is preferably 2 or higher.

When the basic compound is dissolved in a non-aqueous solvent, it is preferable that as the concentration of the basic compound increases, the oxidation-reduction potential (ORP) value decreases. Moreover, if the basic compound includes an acidic group as well as the basic group, then the compound can still be used favorably as the basic compound, despite containing an acidic group, provided the ORP value exhibits this tendency to decrease.

The ORP value of the basic compound is preferably less than 0 mV. When the basic compound includes an acidic group as well as the basic group, the ORP value is preferably from 0 to 200 mV.

The Hansen solubility parameter (HSP value) of the basic compound is preferably from 22 to 27 $MPa^{1/2}$. Further, the basic compound preferably has a dispersion parameter $\delta d$ of 13 to 20, a polar parameter $\delta p$ of 5 to 12, and a hydrogen bonding parameter $\delta h$ of 10 to 20. By ensuring that these ranges are satisfied, the components of the colored resin particles can be blended more uniformly, the particle shape can be stabilized and the stability over time can be improved, and the color development and the abrasion resistance can be further improved.

Examples of the basic group of the basic compound include an amino group or a pyridyl group or the like. The amino group may be a primary amino group, a secondary amino group, a tertiary amino group, or a combination thereof. Among these possibilities, the inclusion of a secondary amino group (imino group) in the basic compound is preferred. Further, other examples of the basic group of the basic compound include nitrogen-containing functional groups having a urethane linkage or an amide linkage or the like. Furthermore, nitrogen-containing structural units such as a urethane linkage or amide linkage may also be introduced into the basic compound.

The basic compound is preferably a liquid organic compound having two or more basic groups within each molecule.

The basic compound may be an oligomer, a polymer or a low-molecular weight compound.

Examples of the oligomer or polymer include polyurethane resins, poly(meth)acrylic-based resins, polyester-based resins, polyvinyl-based resins, polyether-based resins and polyethyleneimines and the like, which may be used individually or in combinations. Further, copolymers of the monomers or oligomers that constitute these resins may also be used.

The basic group may be derived from the monomer that constitutes the oligomer or polymer, thereby introducing a basic group bonded to the main chain or side chain of each structural unit.

Further, an alkylammonium salt or amine salt or the like of an oligomer or polymer may also be introduced as the basic group.

When the basic compound is an oligomer or polymer, the weight-average molecular weight is preferably within a range from 500 to 10,000, and more preferably from 1,000 to 5,000.

Examples of the basic compound include modified polyurethanes, basic group-containing poly(meth)acrylates, basic group-containing polyesters, polyesteramines, polyethyleneimines, quaternary ammonium salts, alkylamine salts such as stearylamine acetate, and fatty acid amine salts. These compounds may be used individually, or a combination of a plurality of compounds may be used.

The basic compound preferably has a base value. The base value of the basic compound is preferably at least 10 mgKOH/g, more preferably 40 mgKOH/g or higher, and even more preferably 70 mgKOH/g or higher.

Here, the base value describes the number of milligrams of potassium hydroxide equivalent to the amount of hydrochloric acid needed to neutralize all of the basic components contained within 1 g of the non-volatile fraction of the compound. This definition also applies below.

Examples of commercially available products that can be used as the basic compound include:

Solsperse 71000 (a polyethyleneimine-based compound, base value: 77 mgKOH/g) and Solsperse 20000 (base value: 32 mgKOH/g), manufactured by The Lubrizol Corporation, and DISPERBYK 109 (base value: 140 mgKOH/g), DISPERBYK 116 (base value: 65 mgKOH/g), DISPERBYK 2155 (base value: 48 mgKOH/g), and DISPERBYK 9077 (base value: 48 mgKOH/g) and the like, manufactured by BYK-Chemie Japan K.K.

The basic compound is preferably added in an amount of 0.1 to 50 mass %, and more preferably 1 to 40 mass %, relative to the total mass of the colored resin particles. This enables the uniformity and stability of the colored resin particle components to be maintained, while avoiding any effects on other raw materials.

In a similar manner to the first embodiment described above, other optional components be added to the colored resin particles, provided they do not impair the effects of the present invention. Examples of these other components include resins other than the thermoplastic solid resin A and plasticizers.

The average particle size of the colored resin particles preferably satisfies the same range as that described above for the first embodiment.

(Method for Producing Colored Resin Particle Dispersion)

An example of the method for producing a colored resin particle dispersion according to the present embodiment is described below.

A colored resin particle dispersion prepared using a fusion-dispersion-cooling method can be obtained by preparing a resin emulsion by dispersing, in a heated and melted state, a dispersion phase containing the colorant, the thermoplastic solid resin A and the basic compound, within a continuous phase containing the non-aqueous solvent and the acidic dispersant, and then cooling this resin emulsion.

In order to ensure stable preparation of the resin emulsion, the acidic dispersant preferably has a higher solubility in the non-aqueous solvent than in the thermoplastic solid resin A. Further, in order to stabilize the shape of the colored resin particles, each of the colorant and the basic compound preferably has a higher solubility in the thermoplastic solid resin A than in the non-aqueous solvent.

With the exceptions of adding the basic compound to the dispersion phase and adding the acidic dispersant to the continuous phase, unless specifically stated otherwise, the colored resin particle dispersion according to this embodiment can be produced in the same manner as that described for the first embodiment.

Continuous Phase

The acidic dispersant of the continuous phase is a dispersant having an acidic group. The acidic dispersant preferably has a higher solubility in the non-aqueous solvent than in the thermoplastic solid resin A.

The solubility of the acidic dispersant in the thermoplastic solid resin A at 23° C. is preferably not more than 3 g/100 g, and more preferably 0.5 g/100 g or less. Further, the solubility of the acidic dispersant in the non-aqueous solvent at 23° C. is preferably at least 3 g/100 g, and more preferably 5 g/100 g or greater. It is even more preferable that the acidic dispersant is selected so that, in the blend proportions used in the resin emulsion, the acidic dispersant dissolves essentially completely in the non-aqueous solvent, and undergoes essentially no dissolution in the thermoplastic solid resin A.

The acidic dispersant is preferably a compound for which, when the acidic dispersant is dissolved in the non-aqueous solvent, the oxidation-reduction potential (ORP) value increases as the concentration of the acidic dispersant increases. Moreover, if the acidic dispersant includes a basic group as well as the acidic group, then the compound can still be used favorably as the acidic dispersant, despite containing a basic group, provided the ORP value exhibits this tendency to increase.

The ORP value of the acidic dispersant is preferably at least 500 mV, and preferably 1,000 mV or greater.

Examples of the acidic group of the acidic dispersant include a phosphoric acid group, carboxyl group, sulfonic acid group, phosphate ester group, sulfate ester group, nitrate ester group, phosphorous acid group, phosphonic acid group and sulfinic acid group. Any one of these groups, or a combination of two or more groups, may be included within each molecule.

The acidic dispersant may be an oligomer, a polymer or a low-molecular weight compound.

Examples of the oligomer or polymer include poly(meth) acrylic-based resins, polyester-based resins, polyvinyl-based resins and polyether-based resins and the like, which may be used individually or in combinations. Further, copolymers of the monomers or oligomers that constitute these resins may also be used.

The acidic group may be derived from the monomer that constitutes the oligomer or polymer, thereby introducing an acidic group bonded to the main chain or side chain of each structural unit.

Further, the acidic group may be introduced by phosphorylation of an oligomer or polymer.

When the acidic dispersant is an oligomer or a polymer, the weight-average molecular weight is preferably within a range from 500 to 10,000, and more preferably from 1,000 to 5,000.

Furthermore, higher fatty acids such as 12-hydroxystearic acid may also be used as the acidic dispersant.

The acidic dispersant preferably has an acid value. The acid value of the acidic dispersant is preferably at least 10 mgKOH/g, more preferably 20 mgKOH/g or higher, and even more preferably 30 mgKOH/g or higher.

Here, the acid value describes the number of milligrams of potassium hydroxide needed to neutralize all of the acidic components within 1 g of the non-volatile fraction of the compound. This definition also applies below.

Examples of commercially available products that can be used as the acidic dispersant include:

Solsperse 3000 (a hexamer of 12-hydroxystearic acid, acid value: 32 mgKOH/g), Solsperse 21000 (acid value: 72 mgKOH/g), Solsperse 36000 (acid value: 45 mgKOH/g), and Solsperse 41000 (acid value: 50 mgKOH/g), manufactured by The Lubrizol Corporation, and DISPERBYK 2096 (acid value: 40 mgKOH/g), manufactured by BYK-Chemie Japan K.K.

From the viewpoints of the stability of the emulsion and the dispersibility of the colored resin particles, the amount of the acidic dispersant in the continuous phase is preferably from 0.1 to 15 mass %, and more preferably from 1 to 10 mass %, relative to the total mass of the continuous phase.

Dispersed Phase

Details regarding the basic compound of the dispersed phase are as described above.

The solubility of the basic compound in the thermoplastic solid resin A at 23° C. is preferably at least 1 g/100 g, and more preferably 2 g/100 g or greater. Further, the solubility of the basic compound in the non-aqueous solvent of the continuous phase at 23° C. is preferably not more than 3 g/100 g, more preferably 1 g/100 g or less, and even more preferably 0.5 g/100 g or less. It is even more preferable that, in the blend proportions used in the resin emulsion, the basic compound dissolves essentially completely in the thermoplastic solid resin A, and undergoes essentially no dissolution in the non-aqueous solvent.

The amount of the basic compound in the dispersed phase may be adjusted appropriately in accordance with the aforementioned blend proportion of the colored resin particles.

The amount of the basic compound relative to the total mass of the colored resin particle dispersion is preferably from 0.1 to 20 mass %, and more preferably from 1 to 15 mass %. This enables the abrasion resistance of the printed items to be further enhanced, reduces the particle size of the colored resin particles, and enables the viscosity of the dispersion to be lowered.

Other optional components may be added to the continuous phase and/or the dispersed phase in the same manner as that described for the first embodiment, provided they do not impair the effects of the present invention. A plasticizer may also be added to the dispersed phase in the same manner as described in the first embodiment.

The method used for preparing the colored resin particle dispersion may be the same method as that described above for the first embodiment.

<Method for Producing Colored Resin Particle Dispersion>

A method for producing a colored resin particle dispersion according to one embodiment of the present invention comprises preparing a resin emulsion by dispersing, in a melted state, a continuous phase containing a basic dispersant and a non-aqueous solvent, and a dispersion phase containing a colorant, a thermoplastic solid resin having a solubility in the non-aqueous solvent of 3 g/100 g or less and a liquid organic compound having an acidic group, and then cooling the resin emulsion.

A method for producing a colored resin particle dispersion according to another embodiment of the present invention comprises preparing a resin emulsion by dispersing, in a melted state, a continuous phase containing an acidic dispersant and a non-aqueous solvent, and a dispersion phase containing a colorant, a thermoplastic solid resin having a solubility in the non-aqueous solvent of 3 g/100 g or less and a liquid organic compound having a basic group, and then cooling the resin emulsion.

The above methods for producing colored resin particle dispersions use a thermoplastic solid resin having a solubility in the non-aqueous solvent of 3 g/100 g or less, but are otherwise methods that yield a colored resin particle dispersion in the same manner as the production methods described above for the first and second embodiments.

The thermoplastic solid resin having a solubility in the non-aqueous solvent of 3 g/100 g or less may employ the thermoplastic solid resin A described above, or a resin other than the thermoplastic solid resin A may be used.

Examples of resins that can be used as this resin other than the thermoplastic solid resin A include resins mentioned in the above description of the thermoplastic solid resin A which do not satisfy the solubility range described for the thermoplastic solid resin A. Moreover, other resins that can be used as the resin other than the thermoplastic solid resin A include polyvinylpyrrolidone, polyvinyl acetal, polysilsesquioxane, methoxysilsesquioxane and ethoxysilsesquioxane resins.

The thermoplastic solid resin preferably has a Hansen solubility parameter (HSP value) of 22 to 27 $MPa^{1/2}$. Further, the thermoplastic solid resin preferably has a dispersion parameter $\delta d$ of 13 to 20, a polar parameter $\delta p$ of 5 to 12, and a hydrogen bonding parameter $\delta h$ of 10 to 20. If these ranges are satisfied, then when an ink prepared from the colored resin particle dispersion is applied to a paper as an inkjet ink, the colored resin particles and the non-aqueous solvent separate rapidly, thus enabling a greater improvement in the abrasion resistance.

With these embodiments, even if a resin which does not exhibit satisfactory alcohol resistance and water resistance is used, printed items having favorable rub fastness and excellent image density can be obtained. Further, the particle size of the colored resin particles can be reduced, and the viscosity of the dispersion can be lowered. This is because the inclusion of the acidic compound or the basic compound in the dispersed phase enables the components of the colored resin particles to be blended more uniformly, and enables the particle size to be reduced.

Further, in these embodiments, by using the aforementioned thermoplastic solid resin A, printed items which also have excellent alcohol resistance and water resistance can be provided.

Furthermore, in the production methods of the above embodiments, because a low-polarity solvent is not used in the dispersed phase, steps such as the removal of the low-polarity solvent are unnecessary.

<Ink>

The ink according to an embodiment of the present invention is an ink containing the colored resin particle dispersion described above. This ink can be used as a general-purpose printing ink for inkjet printing, offset printing, stencil printing, gravure printing, or electrophotographic printing or the like. Because the ink has good dispersion stability, use of the ink as an inkjet ink is particularly preferable.

When used as an inkjet ink, the colored resin particle dispersion may be used as is, but if required, may include any of the various additives typically used in the field, provided these additives do not impair the objects of the present invention. For example, nozzle blockage prevention agents, antioxidants, conductivity modifiers, viscosity modifiers, surface tension regulators, and oxygen absorbers and the like may be added as appropriate. There are no particular limitations on the types of these additives, and any additives used in the field can be used. Further, the colored resin particle dispersion may also be diluted with a non-aqueous solvent described above.

The ideal range for the viscosity of the inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s.

There are no particular limitations on the printing method used with the inkjet ink, and any of various printing systems, including a piezo system, electrostatic system or thermal system may be used. In those cases where an inkjet recording device is used, the ink of the present embodiment is preferably discharged from the inkjet head based on a digital signal, with the discharged ink droplets being adhered to the recording medium.

In the present embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like. Coated printing papers have minimal gaps on the paper surface compared with plain papers and coated papers designed for inkjets, and therefore penetration of the ink is slow, and the ink components are more readily retained on the surface of the paper. As a result, the ink according to the present embodiment is suitable for improving the fixability to coated printing papers.

EXAMPLES

The present invention is described below in further detail using a series of examples, but the present invention is in no way limited by these examples. Unless specifically state otherwise, "%" refers to "mass %".

<Ink Preparation>

Formulations of a series inks and the results of evaluating the inks are shown in Table 2 and Table 3. In each table, when a dispersant includes a volatile component, the total amount of the dispersant is shown, and the non-volatile fraction amount is also shown in parentheses.

(1) Using a twin roll mill, the colorant was mixed and kneaded into the thermoplastic solid resin (namely, subjected to heating and melting, shearing, and uniform dispersion), and solid chips were prepared.

(2) The non-aqueous solvent and the basic dispersant were mixed to prepare the continuous phase.

(3) The solid chips prepared in (1) and the acidic compound were added to the continuous phase prepared in (2), and the resulting mixture was stirred using a magnetic stirrer.

(4) With the mixture undergoing stirring with the magnetic stirrer, the prepared liquid from (3) above was heated to 150° C. on a hotplate, thus causing the solid chips to melt, and the liquid was then irradiated with ultrasound for 10 minutes using an ultrasonic homogenizer (Ultrasonic Processor VC-750, manufactured by Sonics & Materials, Inc.) to obtain a resin emulsion.

(5) The resin emulsion was cooled, and the resulting colored resin particle dispersion was used without further modification as an ink.

The colored resin particles fraction (the acidic compound, the resin, the colorant and the plasticizer) relative to the total mass of the ink was determined, and this fraction is also shown in each table.

TABLE 2

Ink formulations and evaluation results

| | Units: mass % | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Continuous phase | Non-aqueous solvent Isopar M | 61.5 | 61.5 | 61.5 | 61.5 | 61.5 | 61.5 | 59.5 | 59.5 | 67.8 | 59.9 |
| | Basic dispersant | 10.5 | 10.5 | 10.5 | 10.5 | 10.5 | 10.5 | 10.5 | 10.5 | — | 10.5 |
| | (non-volatile fraction 40%) | (4.2) | (4.2) | (4.2) | (4.2) | (4.2) | (4.2) | (4.2) | (4.2) | | (4.2) |
| | Acidic dispersant | — | — | — | — | — | — | — | — | 4.2 | — |
| Dispersed phase | Acidic compound | 7.0 | 7.0 | 7.0 | 7.0 | 7.0 | 7.0 | 7.0 | 7.0 | — | — |
| | (non-volatile fraction 95.0%) | (6.6) | (6.6) | (6.6) | (6.6) | (6.6) | (6.6) | (6.6) | (6.6) | | |
| | Basic compound | — | — | — | — | — | — | — | — | 7.0 | |
| | Amphoteric compound | — | — | — | — | — | — | — | — | — | 8.64 |
| | (non-volatile fraction 81.0%) | | | | | | | | | | (7.0) |
| | Styrene-acrylic resin A | 14.0 | — | — | — | — | — | 14.0 | — | — | — |
| | Styrene-acrylic resin B | — | 14.0 | — | — | — | — | — | — | 14.0 | 14.0 |

TABLE 2-continued

Ink formulations and evaluation results

|  | Units: mass % | Example 1 | Example 2 | Example 3 | Example 4 | Example 5 | Example 6 | Example 7 | Example 8 | Example 9 | Example 10 |
|---|---|---|---|---|---|---|---|---|---|---|---|
|  | Polyester resin | — | — | 14.0 | — | — | — | — | — | — | — |
|  | Epoxy resin | — | — | — | 14.0 | — | — | — | 14.0 | — | — |
|  | Styrene resin | — | — | — | — | 14.0 | — | — | — | — | — |
|  | Thermoplastic polyurethane | — | — | — | — | — | 14.0 | — | — | — | — |
|  | Polyvinyl alcohol | — | — | — | — | — | — | — | — | — | — |
|  | Styrene-maleic acid resin | — | — | — | — | — | — | — | — | — | — |
|  | Butyral resin | — | — | — | — | — | — | — | — | — | — |
|  | Petroleum resin | — | — | — | — | — | — | — | — | — | — |
|  | Polyvinylpyrrolidone | — | — | — | — | — | — | — | — | — | — |
|  | Styrene-acrylic resin C | — | — | — | — | — | — | — | — | — | — |
|  | Plasticizer [acrylic resin] | — | — | — | — | — | — | 2.0 | — | — | — |
|  | Plasticizer [epoxy resin] | — | — | — | — | — | — | — | 2.0 | — | — |
|  | Black pigment [carbon black] | 7.0 | 7.0 | 7.0 | 7.0 | 7.0 | 7.0 | 7.0 | 7.0 | — | — |
|  | Blue dye [1621] | — | — | — | — | — | — | — | — | 7.0 | — |
|  | Blue dye [1605] | — | — | — | — | — | — | — | — | — | 7.0 |
|  | Total (mass %) | 100.0 | 100.0 | 100.0 | 100.0 | 100.0 | 100.0 | 100.0 | 100.0 | 100.0 | 100.0 |
|  | Colored resin particles fraction (mass %) | 27.6 | 27.6 | 27.6 | 27.6 | 27.6 | 27.6 | 29.6 | 29.6 | 28.0 | 28.0 |
| Evaluation results | Rub fastness | A | A | A | A | A | A | A | A | B | B |
|  | Water resistance | A | A | A | A | A | A | A | A | A | A |
|  | Alcohol resistance | A | A | A | A | A | A | A | A | B | B |
|  | Image density | A | A | A | A | A | A | A | A | A | A |
|  | Particle size | A | A | A | A | A | A | AA | AA | B | A |
|  | Ink viscosity | A | A | A | A | A | A | A | A | B | A |

TABLE 3

Ink formulations and evaluation results

|  | Units: mass % | Comparative Example 1 | Comparative Example 2 | Comparative Example 3 | Comparative Example 4 | Comparative Example 5 | Reference Example 1 | Reference Example 2 | Reference Example 3 | Reference Example 4 | Reference Example 5 |
|---|---|---|---|---|---|---|---|---|---|---|---|
| Continuous phase | Non-aqueous solvent Isopar M | 68.5 | 61.5 | 61.5 | 68.5 | 61.5 | 61.5 | 61.5 | 61.5 | 61.5 | 61.5 |
|  | Basic dispersant (non-volatile fraction 40%) | 10.5 (4.2) | 10.5 (4.2) | 10.5 (4.2) | 10.5 (4.2) | 10.5 (4.2) | 10.5 (4.2) | 10.5 (4.2) | 10.5 (4.2) | 10.5 (4.2) | 10.5 (4.2) |
|  | Acidic dispersant | — | — | — | — | — | — | — | — | — | — |
| Dispersed phase | Acidic compound (non-volatile fraction 95.0%) | — | — | 7.0 (6.6) | — | — | 7.0 (6.6) | 7.0 (6.6) | 7.0 (6.6) | 7.0 (6.6) | 7.0 (6.6) |
|  | Basic compound | — | — | — | — | — | — | — | — | — | — |
|  | Amphoteric compound (non-volatile fraction 81.0%) | — | — | — | — | — | — | — | — | — | — |
|  | Styrene-acrylic resin A | — | — | — | 14.0 | 21.0 | — | — | — | — | — |
|  | Styrene-acrylic resin B | — | — | — | — | — | — | — | — | — | — |
|  | Polyester resin | — | — | — | — | — | — | — | — | — | — |
|  | Epoxy resin | — | — | — | — | — | — | — | — | — | — |
|  | Styrene resin | — | — | — | — | — | — | — | — | — | — |
|  | Thermoplastic polyurethane | — | — | — | — | — | — | — | — | — | — |
|  | Polyvinyl alcohol | 14.0 | 21.0 | — | — | — | 14.0 | — | — | — | — |
|  | Styrene-maleic acid resin | — | — | — | — | — | — | 14.0 | — | — | — |
|  | Butyral resin | — | — | — | — | — | — | — | 14.0 | — | — |
|  | Petroleum resin | — | — | 14.0 | — | — | — | — | — | — | — |
|  | Polyvinylpyrrolidone | — | — | — | — | — | — | — | — | 14.0 | — |
|  | Styrene-acrylic resin C | — | — | — | — | — | — | — | — | — | 14.0 |
|  | Plasticizer [acrylic resin] | — | — | — | — | — | — | — | — | — | — |
|  | Plasticizer [epoxy resin] | — | — | — | — | — | — | — | — | — | — |
|  | Black pigment [carbon black] | 7.0 | 7.0 | 7.0 | 7.0 | 7.0 | 7.0 | 7.0 | 7.0 | 7.0 | 7.0 |
|  | Blue dye [1621] | — | — | — | — | — | — | — | — | — | — |
|  | Blue dye [1605] | — | — | — | — | — | — | — | — | — | — |
|  | Total (mass %) | 100.0 | 100.0 | 100.0 | 100.0 | 100.0 | 100.0 | 100.0 | 100.0 | 100.0 | 100.0 |
|  | Colored resin particles fraction (mass %) | 21.0 | 28.0 | 27.6 | 21.0 | 28.0 | 27.6 | 27.6 | 27.6 | 27.6 | 27.6 |

TABLE 3-continued

Ink formulations and evaluation results

| | Units: mass % | Comparative Example 1 | Comparative Example 2 | Comparative Example 3 | Comparative Example 4 | Comparative Example 5 | Reference Example 1 | Reference Example 2 | Reference Example 3 | Reference Example 4 | Reference Example 5 |
|---|---|---|---|---|---|---|---|---|---|---|---|
| Evaluation results | Rub fastness | C | C | C | C | C | A | A | A | B | A |
| | Water resistance | B | B | A | B | B | A | A | A | C | A |
| | Alcohol resistance | C | C | A | B | B | C | C | C | C | C |
| | Image density | C | C | C | C | C | A | A | A | A | A |
| | Particle size | C | C | C | C | C | A | A | A | A | A |
| | Ink viscosity | C | C | B | C | C | A | A | A | A | A |

The components shown in each of the tables are described below.

(Continuous Phase)

Non-aqueous solvent: Isopar M, an isoparaffin-based solvent, manufactured by TonenGeneral Sekiyu K.K., 50% distillation point: 234° C.

Basic dispersant: an amine-modified methacrylic block copolymer, non-volatile fraction: 40%, prepared in accordance with the production example described below.

Acidic dispersant: Solsperse 3000, manufactured by The Lubrizol Corporation, non-volatile fraction: 100%.

(Dispersed Phase)

Acidic compound: DISPERBYK 111, a liquid organic compound having two phosphoric acid groups (a phosphate ester compound having phosphoric acid groups at both terminals of a copolymer), manufactured by BYK-Chemie Japan K.K., acid value 129 mgKOH/g, non-volatile fraction 95.0/0.

Basic compound: Solsperse 71000, a liquid organic compound having a secondary amino group (imino group), manufactured by The Lubrizol Corporation, base value: 77 mgKOH/g, non-volatile fraction 100%.

Amphoteric compound: BYK 180, manufactured by BYK-Chemie Japan K.K., non-volatile fraction 81.0%.

Plasticizer [acrylic resin]: UP1080, manufactured by Toagosei Co., Ltd., Tg: −61° C., Mw: 6,000.

Plasticizer [epoxy resin]: jER828, manufactured by Mitsubishi Chemical Corporation, Mw: 370, liquid at normal temperature.

Black pigment: carbon black, Pigment Black 7.

Blue dye [1621]: Valifast Blue 1621, a salt-forming dye, manufactured by Orient Chemical Industries Co., Ltd.

Blue dye [1605]: Valifast Blue 1605, a metal phthalocyanine-based dye, manufactured by Orient Chemical Industries Co., Ltd.

Mw values above represent weight-average molecular weights.

Details of the resins shown in each of the tables are shown in Table 4.

TABLE 4

Details of resins

| Resin type Manufacturer | Mw | HSP | $\delta d$ | $\delta p$ | $\delta h$ | Methanol solubility | Isopar M solubility |
|---|---|---|---|---|---|---|---|
| Styrene-acrylic resin A [ARUFON UC3900] Toagosei Co., Ltd, | 4600 | 21.0 | 18.1 | 4.6 | 9.7 | insoluble | insoluble |
| Styrene-acrylic resin B [ARUFON UH-2170] Toagosei Co., Ltd. | 14000 | 22.3 | 17.8 | 9.7 | 9.2 | insoluble | insoluble |
| Polyester resin [Polyester HP-325] The Nippon Synthetic Chemical Industry Co., Ltd. | — | 21.1 | 18.1 | 9.0 | 6.3 | insoluble | insoluble |
| Epoxy resin [#1001] Mitsubishi Chemical Corporation | 900 | 23.0 | 18.1 | 9.9 | 10.3 | insoluble | insoluble |
| Styrene resin [HIMER ST-95] Sanyo Chemical Industries, Ltd. | 4000 | 19.4 | 18.1 | 3.5 | 6.3 | insoluble | insoluble |
| Thermoplastic polyurethane [ESTANE 5715] The Lubrizol Corporation | — | 22.3 | 17.9 | 8.4 | 10.3 | insoluble | insoluble |
| Polyvinyl alcohol [JMR-8L] Japan VAM & Poval Co., Ltd. | 15000 | 23.6 | 17.7 | 9.7 | 12.2 | soluble | insoluble |
| Styrene-maleic acid resin [SMA resin 1440F] Kawahara Petrochemical Co., Ltd. | 7000 | 24.1 | 17.6 | 9.9 | 13.2 | soluble | insoluble |
| Butyral resin [S-LEC BL-10] Sekisui Chemical Co., Ltd. | 15000 | 23.4 | 17.1 | 7.1 | 14.3 | soluble | insoluble |
| Petroleum resin [QTND200] Zeon Corporation | 1200 | 19.4 | 18.0 | 1.8 | 7.0 | insoluble | soluble |
| Polyvinylpyrrolidone [PVPK30] Wako Pure Chemical Industries, Ltd. | 40000 | 30.8 | 17.6 | 9.9 | 23.2 | soluble | insoluble |
| Styrene-acrylic resin C [UC3920] Toagosei Co., Ltd. | 15000 | 23.9 | 17.2 | 7.2 | 14.9 | soluble | insoluble |

In Table 4, the methanol solubility was determined on the basis of whether or not 10 g of the resin would dissolve in 100 g of methanol at 23° C. Further, the Isopar M solubility was determined on the basis of whether or not 3 g of the resin would dissolve in 100 g of Isopar M at 23° C.

The basic dispersant and the acidic dispersant were dissolved in the non-aqueous solvent in the ink formulations shown in Table 2 and Table 3.

The solubility in the non-aqueous solvent of each of the acidic compound, the basic compound, the amphoteric compound, the plasticizers and the colorants was less than 3 g/100 g.

The solubility parameter (HSP value) of each of the components is detailed below. The units are MPa$^{1/2}$. Further, the dispersion parameter δd, the polar parameter δp, and the hydrogen bonding parameter δh are also shown below.

Solvent [Isopar M]: 16 (δd=16, δp=0, δh=0).

Acidic compound: within a range from 22 to 27 (δd=12 to 20, δp=5 to 12, δh=10 to 20).

Basic compound: within a range from 22 to 27 (δd=12 to 20, δp=5 to 12, δh=10 to 20).

Amphoteric compound: within a range from 22 to 27 (δd=12 to 20, δp=5 to 12, δh=10 to 20).

The oxidation-reduction potential (ORP value) of each component is listed below. The units are mV.

Basic compound, Basic dispersant: the ORP value when dissolved in methanol or dodecane at 5.0 mass % was lower than the ORP value when dissolved at 0.5 mass %, and the ORP value when dissolved in methanol or dodecane at 5.0 mass % was 0 or less.

Acidic compound, acidic dispersant: the ORP value when dissolved in methanol or dodecane at 5.0 mass % was higher than the ORP value when dissolved at 0.5 mass %, and the ORP value when dissolved in methanol or dodecane at 5.0 mass % was 200 or greater.

Amphoteric compound: the ORP value when dissolved in methanol at 5 mass % was at least 0 but less than 200.

<Method for Producing Amine-Modified Methacrylic Block Polymer>

The method used for producing the amine-modified methacrylic block polymer used as the basic dispersant in the examples is described below.

(Step (1-1): First Stage, Preparation of Methacrylic Polymer (PA))

Table 5 shows the formulation and physical properties for the methacrylic polymer used for preparing the basic dispersant.

In accordance with the first stage formulation shown in Table 5, a round-bottom flask was charged with dodecyl methacrylate, behenyl methacrylate, 2-cyano-2-propyl dodecyl trithiocarbonate (RAFT agent, manufactured by Sigma-Aldrich Co. LLC.), AIBN (azobisisobutyronitrile, polymerization initiator, manufactured by Wako Pure Chemical Industries, Ltd.) and Isopar M (manufactured by TonenGeneral Sekiyu K.K.). Following thorough deaeration, the atmosphere in the flask was replaced with an inert gas (argon), and the flask contents were stirred under heating at 90° C. for 24 hours. The solution of the thus obtained polymer PA had a non-volatile fraction of 40 mass %. The weight-average molecular weight of the polymer PA following the reaction was 20,000.

(Step (1-2): Second Stage, Preparation of Methacrylic Block Polymer (PA-AB))

Table 6 shows the formulation and physical properties of the methacrylic block polymer.

Following the reaction for producing the polymer PA, dodecyl methacrylate, behenyl methacrylate, glycidyl methacrylate, AIBN and Isopar M were added to the polymer PA in accordance with the second stage formulation shown in Table 6. Following deaeration and inert gas replacement in the same manner as described above, the flask contents were stirred under heating at 90° C. for 24 hours. The solution of the thus obtained polymer PA-AB had a non-volatile fraction of 40 mass %. The weight-average molecular weight of the polymer PA-AB following the reaction was 35,000. In the table, the blend amount of the polymer PA indicates the value for the entire solution.

In Table 6, the proportion of the monomer A in the methacrylic block polymer was determined from the molar ratio of the monomer A relative to the total amount of all the blended monomers. The proportion of the monomer B in the methacrylic block polymer was determined from the molar ratio of the monomer B relative to the total amount of all the blended monomers.

The block A:block B molar ratio was determined from the ratio between the total number of moles of monomer used in the first stage and the total number of moles of monomer used in the second stage.

The proportion of the monomer B in the block B is the ratio of the number of moles of the monomer B relative to the total number of moles of monomer used in the second stage.

(Step (2): Preparation of Amine-Modified Methacrylic Block Polymer (AmPA-AB)

Table 7 shows the formulation and physical properties of the amine-modified methacrylic block polymer.

Following the reaction for producing the methacrylic block polymer PA-AB, a round-bottom flask was charged with the methacrylic block polymer PA-AB (non-volatile fraction: 40%) and diethanolamine in accordance with the formulation shown in Table 7, and the resulting mixture was stirred under heating at 110° C. for 3 hours, yielding an amine-modified methacrylic block polymer AmPA-AB with a non-volatile fraction of 40%.

The weight-average molecular weight of the thus obtained amine-modified methacrylic block polymer AmPA-AB was the same as that of the methacrylic block polymer PA-AB.

In Table 7, the molar ratio of the diethanolamine relative to the monomer B was determined from the respective amounts added.

Details relating to each of the monomers shown in the tables are as follows.

Dodecyl methacrylate: molecular weight: 254, carbon number of the alkyl group: 12, manufactured by Wako Pure Chemical Industries, Ltd.

Behenyl methacrylate: molecular weight: 380, carbon number of the alkyl group: 22, Blemmer VMA-70, manufactured by NOF Corporation.

Glycidyl methacrylate: molecular weight: 142, manufactured by Wako Pure Chemical Industries, Ltd.

TABLE 5

First stage: formulation and physical properties of methacrylic polymer PA

| | Units: g | PA |
|---|---|---|
| Monomer A | Dodecyl methacrylate | 13.69 |
| | Behenyl methacrylate | 21.24 |
| RAFT agent | 2-cyano-2-propyl dodecyl trithiocarbonate | 0.60 |
| Polymerization initiator | AIBN | 0.29 |
| Polymerization solvent | Isopar M | 53.74 |
| Total (mass %) | | 89.56 |
| Non-volatile fraction (mass %) | | 40.00 |
| Weight-average molecular weight | | 20,000 |

TABLE 6

Second stage: formulation and physical properties of methacrylic block polymer PA-AB

| Units: g | | PA-AB |
|---|---|---|
| Monomer configuration | | A-AB |
| Polymer PA (non-volatile fraction 40%) | | 50.00 |
| Monomer A | Dodecyl methacrylate | 3.95 |
| | Behenyl methacrylate | 6.12 |
| Monomer B | Glycidyl methacrylate | 4.41 |
| Polymerization initiator | AIBN | 0.16 |
| Polymerization solvent | Isopar M | 21.96 |
| Total (mass %) | | 86.60 |
| Non-volatile fraction (mass %) | | 40.00 |
| Weight-average molecular weight | | 35,000 |
| Monomer composition | Monomer A (mol) | 0.09 |
| | Monomer B (mol) | 0.03 |
| Monomer A:Monomer B molar ratio | | 3:1 |
| Block A:Block B molar ratio | | 1:1 |
| Monomer A within block A (mol %) | | 100 |
| Monomer B within block B (mol %) | | 50 |

TABLE 7

Formulation and physical properties of amine-modified methacrylic block polymer AmPA-AB

| Units: g | AmPA-AB |
|---|---|
| Methacrylic block polymer PA-AB (non-volatile fraction 40%) | 50.00 |
| Diethanolamine (DEA) | 1.85 |
| Isopar M | 2.77 |
| Total (g) | 54.62 |
| Non-volatile fraction (mass %) | 40.00 |
| Molar ratio of DEA relative to monomer B (equivalents) | 0.98 |

<Evaluations>

Using each of the inks described above, each of the following evaluations was performed. The results are shown in each of the tables.

(Rub Fastness)

Each of the inks described above was mounted in a line-type inkjet printer Orphis-X9050 (manufactured by Riso Kagaku Corporation), and a printed item was obtained by printing a solid image onto a high-quality coated paper "Aurora Coated Paper" (manufactured by Nippon Paper Industries Co., Ltd.). The printing was performed at a resolution of 300×300 dpi, under discharge conditions including an ink volume per dot of 42 pl. The Orphis X9050 is a system that uses a line-type inkjet head, wherein the paper is transported in a sub-scanning direction perpendicular to the main scanning direction (the direction along which the nozzles are aligned) while printing is conducted.

Following standing for 24 hours after printing, the solid image portion of the printed item was rubbed strongly 5 times with a finger. The state of the printed item was then inspected visually, and the rub fastness was evaluated against the following criteria.

A: almost no separation of the image could be detected.
B: minor separation of the image was confirmed, but not problematic in actual use.
C: marked separation of the image occurred, at a level problematic for actual use.

(Water Resistance)

A printed item was obtained in the same manner as that described above for the rub fastness evaluation. Following standing for 24 hours after printing, 0.5 ml of water was dripped onto the solid image portion of the printed item, the level of bleeding was observed visually, and the water resistance was evaluated against the following criteria.

A: no bleeding of the printed image portion.
B: minor bleeding of the printed image portion, but not problematic in actual use.
C: bleeding of the printed image portion at a level problematic for actual use.

(Alcohol Resistance)

A printed item was obtained in the same manner as that described above for the rub fastness evaluation. Following standing for 24 hours after printing, 0.5 ml of a 70% aqueous solution of ethanol was dripped onto the solid image portion of the printed item, and after 10 seconds, the solid image portion was rubbed with a finger. The state of the printed item was observed visually, and the alcohol resistance was evaluated against the following criteria.

A: almost no separation of the image could be detected.
B: minor separation of the image was confirmed, but not problematic in actual use.
C: marked separation of the image occurred, at a level problematic for actual use.

(Image Density)

A printed item was obtained in the same manner as that described above for the rub fastness evaluation. Following standing for 24 hours after printing, the density of the printed item was inspected visually, and the image density was evaluated against the following criteria.

A: the image was uniform, and satisfactory density had been obtained.
B: the image was uniform, but the density appeared low.
C: the image was not uniform, and the density appeared low.

(Average Particle Size of Colored Resin Particles)

For each of the inks described above, the volume-based average particle size of the colored resin particles dispersed in the ink was measured using a dynamic light scattering particle size distribution analyzer (LB-500, manufactured by Horiba, Ltd.). Based on the measurement result, evaluation was performed against the following criteria.

AA: average particle size of 150 nm or less.
A: average particle size exceeding 150 nm but 200 nm or less.
B: average particle size exceeding 200 nm but 300 nm or less.
C: average particle size exceeding 300 nm.

(Ink Viscosity)

The ink viscosity was evaluated by measuring the viscosity at 10 Pa when the shear stress was raised from 0 Pa at a rate of 0.1 Pa/s and at a temperature of 23° C. using a Rheometer AR-G2, manufactured by TA Instruments, Japan Inc. (cone angle: 2°, diameter 40 mm), and then evaluating the measured value against the following criteria.

A: ink viscosity of 8 to 13 mPa·s.
B: ink viscosity exceeding 13 mPa·s but not more than 15 mPa·s.
C: ink viscosity exceeding 15 mPa·s.

As is evident from the tables shown above, the ink of each example exhibited favorable results for all the evaluations, and furthermore, the average particle size of the colored resin particles and the viscosity also fell within appropriate ranges.

In each example, a resin that satisfied the requirements of the present invention was used, and a printed item having excellent rub fastness, water resistance and alcohol resistance was able to be obtained.

In Examples 1 to 8, the acidic compound was added to the colored resin particles, and the rub fastness and image density were able to be further improved, the particle size was able to be further reduced, and the ink viscosity was able to be further lowered.

In Examples 7 and 8, a plasticizer was also added to the colored resin particles, and the particle size was able to be reduced even further.

In Examples 9 and 10, a basic compound and an ampho-teric compound respectively were added to the colored resin particles, and satisfactory results were able to be achieved.

In Comparative Examples 1, 2, 4 and 5, the acidic compound was not included in the colored resin particles, and the rub fastness, the image density, the particle size and the ink viscosity all deteriorated.

In Comparative Examples 4 and 5, a resin that satisfied the requirements of the present invention was used, but when no acidic compound was added, satisfactory results could not be obtained.

In Comparative Example 3, the petroleum resin dissolved completely in the non-aqueous solvent, and therefore the ink viscosity increased and the particle size also increased. Further, the rub fastness and the image density deteriorated.

In Reference Examples 1 to 5, although the alcohol resistance of the printed items deteriorated, printed items having excellent rub fastness and image density were able to be obtained. Further, the average particle size of the colored resin particles and the viscosity also fell within appropriate ranges. Reference Example 4 also exhibited poor water resistance, but in Reference Examples 1 to 3 and 5, a thermoplastic solid resin having favorable water resistance was used, and the water resistance evaluations were excellent.

Based on the above results, it is evident that by using the method described in the examples of the present invention, printed items having excellent rub fastness and image density can be obtained.

The thermoplastic solid resins used in Reference Examples 1 to 5 displayed solubility in ethanol, and therefore the alcohol resistance of the printed items deteriorated.

In Reference Example 4, the polyvinylpyrrolidone resin had both poor alcohol resistance and poor water resistance, and therefore the alcohol resistance and the water resistance of the printed items deteriorated.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A colored resin particle dispersion comprising colored resin particles, a dispersant and a non-aqueous solvent,
   wherein the colored resin particles comprise a colorant, a thermoplastic solid resin and a liquid organic compound having an acidic group, a basic group, or a combination thereof,
   the liquid organic compound has at least the acidic group when the dispersant is a basic dispersant, and the liquid organic compound has at least the basic group when the dispersant is an acidic dispersant, and
   the thermoplastic solid resin has a polar parameter $\delta p$ and a hydrogen bonding parameter $\delta h$ from the Hansen solubility parameters that satisfy $\delta p=2.5$ to $11.0$ and $\delta h=5.0$ to $12.0$ respectively.

2. The colored resin particle dispersion according to claim 1, wherein the liquid organic compound has at least the acidic group, and the acidic group of the liquid organic compound comprises a phosphoric acid group.

3. The colored resin particle dispersion according to claim 1, wherein the non-aqueous solvent has a Hansen solubility parameter of 14 to 18 MPa$^{1/2}$, a dispersion parameter $\delta d$ of 12 to 20, a polar parameter $\delta p$ of 0 to 4, and a hydrogen bonding parameter $\delta h$ of 0 to 4.

4. The colored resin particle dispersion according to claim 1, wherein the colored resin particles further comprise a plasticizer.

5. The colored resin particle dispersion according to claim 1, wherein an average particle size of the colored resin particles is not more than 1 µm.

6. The colored resin particle dispersion according to claim 1, wherein the liquid organic compound has at least the acidic group, and the acidic group of the liquid organic compound comprises at least one of a phosphoric acid group, a carboxyl group, a sulfonic acid group, a phosphate ester group, a sulfate ester group, a nitrate ester group, a phosphorous acid group, a phosphonic acid group and a sulfinic acid group.

7. The colored resin particle dispersion according to claim 1, when the liquid organic compound has at least the basic group, and the basic group of the liquid organic compound comprises at least one of an aminogroup, a pyridyl group, a nitrogen-containing functional group having a urethane linkage and a nitrogen-containing functional group having an amide linkage.

8. The colored resin particle dispersion according to claim 1, wherein the thermoplastic solid resin comprises at least one of styrene-(meth)acrylic-based resins, (meth)acrylic-based resins, polyester resins, epoxy resins, styrene resins, thermoplastic polyurethane-based resins, polyvinyl alcohols, styrene-maleic acid resins, alkylphenol resins, cellulose-based resins, polyamide resins, ketone resins, rosin resins, vinyl acetate resins, phosphorylated resins, nitrated resins, alkoxy group-containing resins, and derivatives of these resins.

9. The colored resin particle dispersion according to claim 4, wherein the melting point of the plasticizer is 23 degrees C. or lower, and the plasticizer comprises at least one of alcohols, esters, ethers, polyesters, polyethers, epoxy resins and (meth)acrylic polymers.

10. A method for producing a colored resin particle dispersion,
   the method comprising preparing a resin emulsion by dispersing a dispersion phase containing a colorant, a thermoplastic solid resin and a liquid organic compound having an acidic group, a basic group, or a combination thereof with the thermoplastic solid resin in a melted state in a continuous phase containing a dispersant and a non-aqueous solvent, and
   then cooling the resin emulsion,
   wherein the thermoplastic solid resin has a solubility in the non-aqueous solvent of 3 g/100 g or less, and
   the liquid organic compound has at least the acidic group when the dispersant is a basic dispersant, and the liquid organic compound has at least the basic group when the dispersant is an acidic dispersant.

11. The method for producing a colored resin particle dispersion according to claim 10, wherein the thermoplastic solid resin has a polar parameter $\delta p$ and a hydrogen bonding parameter $\delta h$ from the Hansen solubility parameters that satisfy $\delta p=2.5$ to $11.0$ and $\delta h=5.0$ to $12.0$ respectively.

12. The method for producing a colored resin particle dispersion according to claim 10, wherein an average particle size of the colored resin particles is not more than 1 µm.

13. The method for producing a colored resin particle dispersion according to claim 10, wherein the liquid organic compound has at least the acidic group, and the acidic group of the liquid organic compound comprises at least one of a phosphoric acid group, a carboxyl group, a sulfonic acid group, a phosphate ester group, a sulfate ester group, a nitrate ester group, a phosphorous acid group, a phosphonic acid group and a sulfinic acid group.

14. The method for producing a colored resin particle dispersion according to claim 10, wherein the liquid organic compound has at least the basic group, an the basic group of the liquid organic compound comprises at least one of an amino group, a pyridyl group, a nitrogen-containing functional group having a urethane linkage and a nitrogen-containing functional group having an amide linkage.

15. The method for producing a colored resin particle dispersion according to claim 10, wherein the thermoplastic solid resin comprises at least one of styrene-(meth)acrylic-based resins, (meth)acrylic-based resins, polyester resins, epoxy resins, styrene resins, thermoplastic polyurethane-based resins, polyvinyl alcohols, styrene-maleic acid resins, alkylphenol resins, cellulose-based resins, polyamide resins, ketone resins, rosin resins, vinyl acetate resins, phosphorylated resins, nitrated resins, alkoxy group-containing resins, and derivatives of these resins.

16. The method for producing a colored resin particle dispersion according to claim 10, wherein the dispersion phase further contains a plasticizer which melting point is 23 degrees C. or lower, and the plasticizer comprises at least one of alcohols, esters, ethers, polyesters, polyethers, epoxy resins and (meth)acrylic polymers.

17. An inkjet ink comprising the colored resin particle dispersion according to claim 1.

* * * * *